(12) United States Patent
Yamada

(10) Patent No.: US 10,439,774 B2
(45) Date of Patent: Oct. 8, 2019

(54) DATA PROCESSING USING DEFINED DATA DEFINITIONS

(71) Applicant: VitaNet Japan, Inc., Minato-ku, Tokyo (JP)

(72) Inventor: Takeo Yamada, Tokyo (JP)

(73) Assignee: VitaNet Japan, Inc., Tokyo (JP)

( * ) Notice: Subject to any disclaimer, the term of this patent is extended or adjusted under 35 U.S.C. 154(b) by 0 days.

(21) Appl. No.: 15/727,200

(22) Filed: Oct. 6, 2017

(65) Prior Publication Data

US 2018/0102886 A1 Apr. 12, 2018

Related U.S. Application Data

(60) Provisional application No. 62/405,361, filed on Oct. 7, 2016.

(51) Int. Cl.
| | |
|---|---|
| *H04L 5/00* | (2006.01) |
| *H04L 1/00* | (2006.01) |
| *H04L 12/721* | (2013.01) |
| *H04W 4/20* | (2018.01) |
| *H04L 29/08* | (2006.01) |

(52) U.S. Cl.
CPC .......... *H04L 5/0044* (2013.01); *H04L 1/0005* (2013.01); *H04L 45/566* (2013.01); *H04L 67/00* (2013.01); *H04W 4/203* (2013.01)

(58) Field of Classification Search
CPC ... H04L 5/0044; H04L 1/0005; H04L 45/566; H04L 67/00; H04W 4/203
USPC ........................................................ 370/329
See application file for complete search history.

(56) References Cited

U.S. PATENT DOCUMENTS

| | | | | |
|---|---|---|---|---|
| 7,873,673 | B2 * | 1/2011 | Cleveland | G01D 21/00 707/802 |
| 8,588,192 | B2 * | 11/2013 | Padmanabh | H04L 67/12 340/853.1 |
| 9,386,023 | B2 * | 7/2016 | MacDonald | H04L 63/102 |
| 9,501,795 | B1 * | 11/2016 | Friedman | G06Q 40/06 |
| 2004/0015723 | A1 * | 1/2004 | Pham | H04L 63/0407 726/27 |
| 2007/0210916 | A1 * | 9/2007 | Ogushi | G06Q 10/0875 340/531 |
| 2011/0289186 | A1 * | 11/2011 | Bell | B60R 25/00 709/217 |
| 2012/0003935 | A1 * | 1/2012 | Lydon | G06F 13/387 455/41.2 |
| 2014/0098778 | A1 * | 4/2014 | Valentin | H04L 67/32 370/329 |

(Continued)

*Primary Examiner* — Mong-Thuy T Tran
(74) *Attorney, Agent, or Firm* — Mintz Levin Cohn Ferris Glovsky and Popeo, P.C.

(57) ABSTRACT

A system, a method, and a computer program product for processing data using defined data definitions in communications systems. A communication link is established between a first device and a second device. At least one or more data packets are exchanged between the first device and the second device. The first device uses at least one first data definition to extract data from one or more payloads of the one or more data packets when the data packets are received from the second device. The second device uses at least one second data definition to extract data from one or more payloads of the one or more data packets when the data packets are received from the first device.

21 Claims, 21 Drawing Sheets

(56) References Cited

U.S. PATENT DOCUMENTS

| | | | |
|---|---|---|---|
| 2014/0119316 A1* | 5/2014 | Linden | H04L 5/0044 |
| | | | 370/329 |
| 2015/0193233 A1* | 7/2015 | Eberle | G06F 9/3016 |
| | | | 712/210 |
| 2015/0281107 A1* | 10/2015 | Dorcey | H04L 47/35 |
| | | | 370/235 |
| 2015/0373167 A1* | 12/2015 | Murashov | H04L 69/321 |
| | | | 370/392 |
| 2016/0219024 A1* | 7/2016 | Verzun | H04L 63/102 |

\* cited by examiner

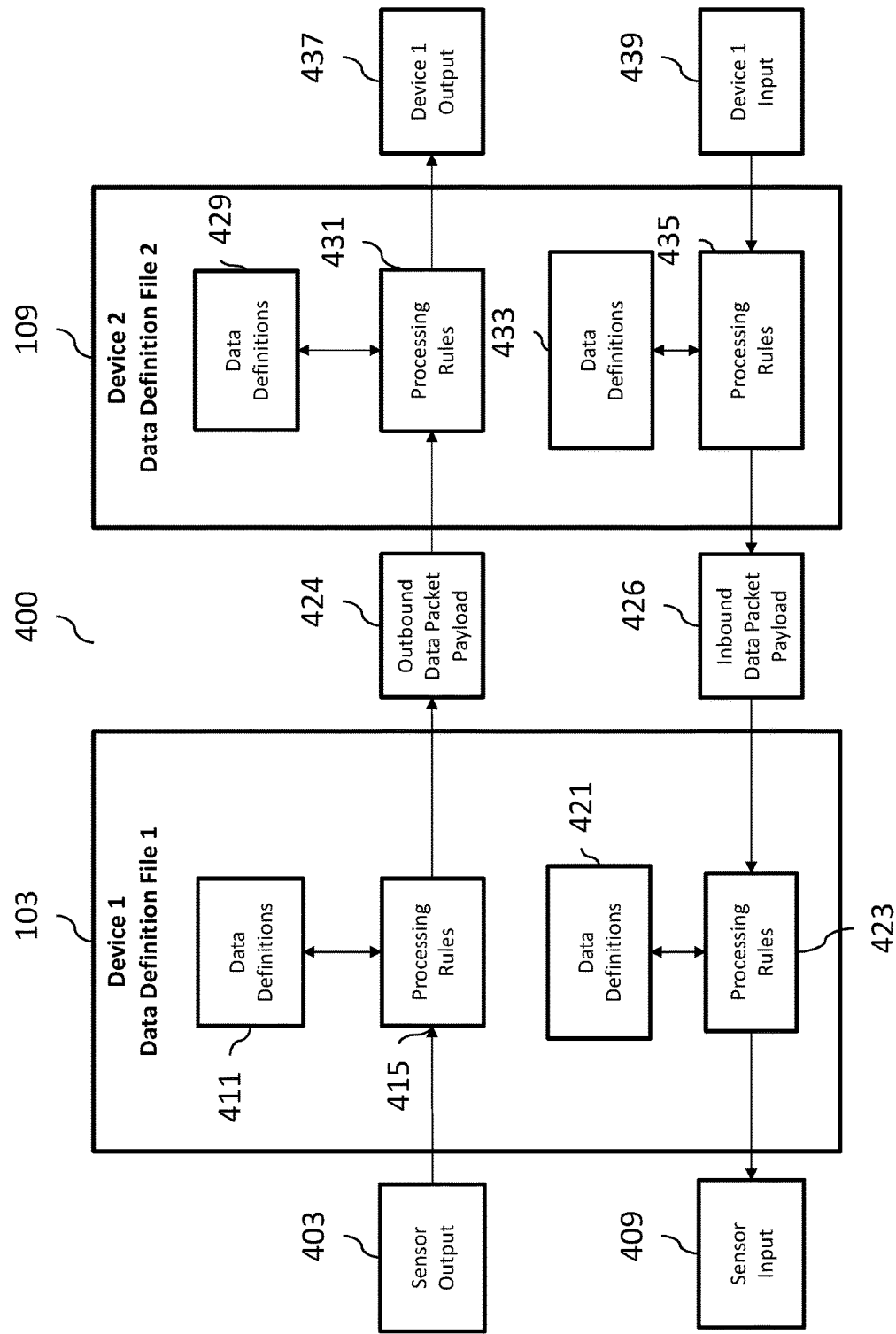

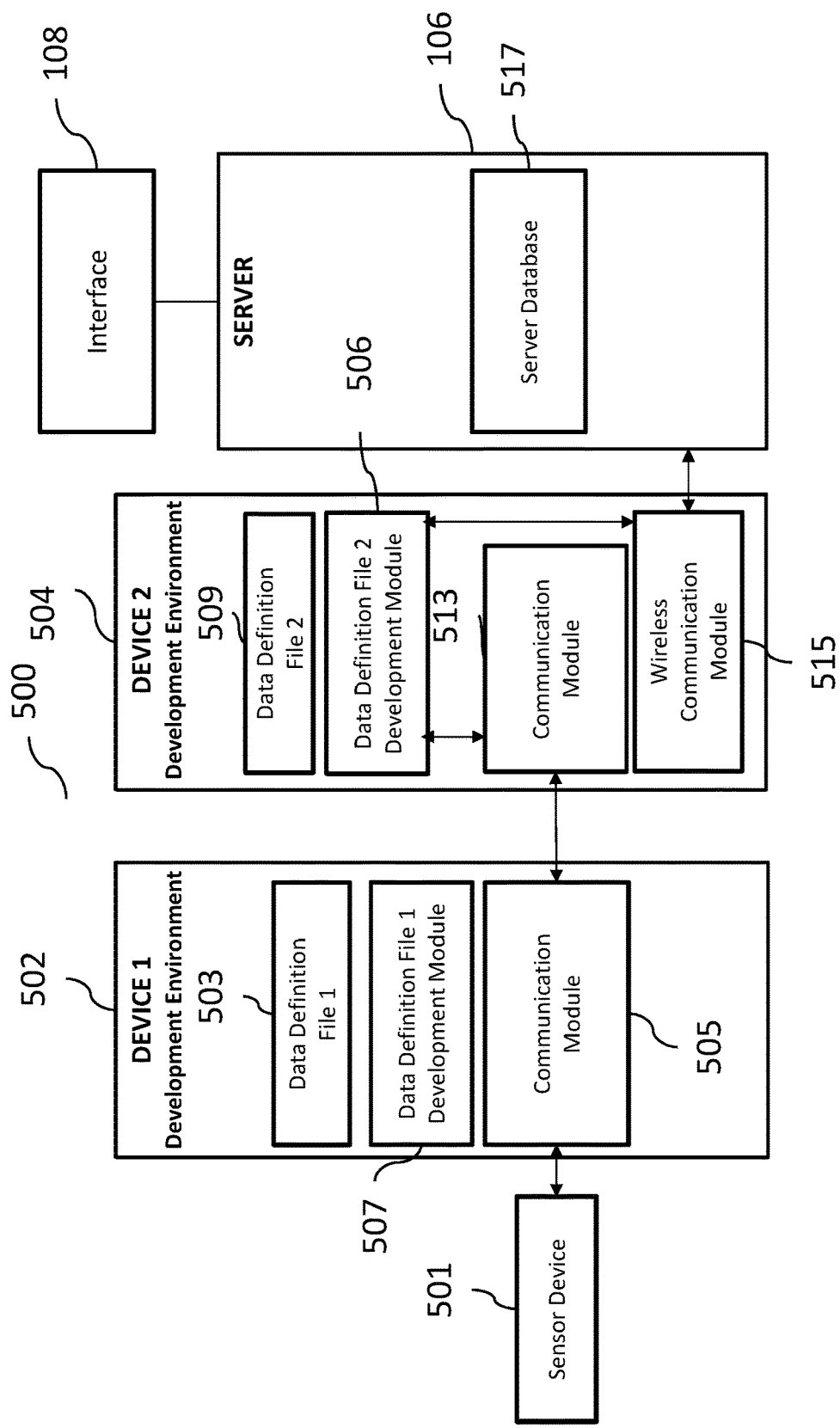

DATA PROCESSING USING DEFINED DATA DEFINITIONS

CROSS-REFERENCE TO RELATED APPLICATIONS

The present application claims priority to U.S. Provisional Patent Appl. No. 62/405,361 to Yamada, filed Oct. 7, 2016, and entitled "Data Processing Using Defined Data Definitions In Wireless Communications", and incorporates its disclosure herein by reference in its entirety.

TECHNICAL FIELD

This disclosure relates generally to data processing and, in particular, to exchanging and/or processing of data using data definitions in wireless communication systems, such as, Bluetooth low energy communications and/or any other wireless and/or wired communications.

BACKGROUND

Modern telecommunications systems serve a vast number of devices, which can include wireless telephones, smartphones, tablet computers, personal computers, personal digital assistants, and/or other devices. Typically, these devices communicate with one another through various networks that can include base stations, wireless access points, servers, etc. To communicate with one another, the devices typically send and/or receive data packets containing information, e.g., emails, hypertext transfer protocol ("HTTP") data, message, etc. A data packet includes control information and user data, i.e., a payload. Control information provides data for delivering the payload (e.g., source and destination network addresses, error detection codes, sequencing information, etc.) and is found in packet headers and trailers.

Payloads of data packets can be used to carry data and/or instructions to devices. In some cases, a single data packet's payload might not fit all the information/data that is desired to be transmitted and hence, more data packets may need to be transmitted. In other cases, payloads of data packets can accommodate a large amount of information/data. The receiving devices may have difficulty extracting the data contained in the payloads, thereby delaying implementation and/or usage of data contained therein. Thus, there is a need for a way to provide receiving and/or transmitting devices with abilities to generate payloads of data packets as well as extract data from received payloads of data packets in an efficient and cost-effective manner.

SUMMARY

In some implementations, the current subject matter relates to a computer implemented method for providing a communication between a plurality of devices. The method can include establishing a communication link between a first device and a second device, exchanging one or more data packets between the first device and the second device, wherein the first device uses at least one first data definition to extract data from one or more payloads of the one or more data packets when the one or more data packets is received from the second device and the second device uses at least one second data definition to extract data from one or more payloads of the one or more data packets when the one or more data packets is received from the first device. At least one of the establishing and the exchanging can be performed using at least one processor of at least one computing system.

In some implementations, the current subject matter can include one or more of the following optional features. A payload of one or more data packets transmitted to the first device can be generated in accordance with at least one first data definition. A payload of one or more data packets transmitted to the second device can be generated in accordance with at least one second data definition. At least one first data definition can be associated with a first data definition identifier. The first device can be configured to request at least one first data definition using the first data definition identifier. At least one second data definition can be associated with a second data definition identifier. The second device can be configured to request at least one second data definition using the second data definition identifier.

The first device can be a pairing device and the second device can be a communications device. In some implementations, the devices can be computing devices, telephones, wireless telephones, smartphones, tablet computers, personal computers, laptop computers, servers, gateways, networking element(s), network(s) of devices, relay and/or intermediate devices (e.g., devices through which data packets are configured to pass through), endpoint devices, wireless and/or wired speakers, wireless and/or wired receivers and/or transceivers, base stations (e.g., macro, micro, femto, pico, etc. base stations), routers, modems, and/or any other type of devices, and/or any combinations thereof.

In some implementations, the first data definition can specify a first data (including type, location, etc.) in the payload(s) of the data packet(s) received by the first device based on the inclusion of the first data (including its type, location, etc.) in the payload(s) of the data packet(s) by the second device. The second data definition can specify a second data (including type, location, etc.) in the payload(s) of the data packet(s) received by the second device based on the inclusion of the second data (including its type, location, etc.) in the payload(s) of the data packet(s) by the first device.

In some implementations, a server can be communicatively coupled to at least one of the first device and the second device. The server can generate at least one of the first data definition and the second data definition. The server can provide at least one of the first data definition and the second data definition to at least one of the first device and the second device.

In some implementations, exchanging of data between the first device and the second device can be dependent on the first device using the first data definition and the second device using the second data definition. Alternatively, exchanging of data between the first device and the second device can be dependent on the first data definition being dependent on the second data definition and/or vice versa.

In some implementations, a plurality of first devices can be communicatively coupled to a plurality of second devices, where each first device in the plurality of first devices can use its own first data definition in a plurality of first data definitions and each second device in the plurality of second devices can use its own second data definition in a plurality of second data definitions.

In some implementations, the method can further include receiving, by the first device, a first data definition identifier corresponding to at least one first data definition, and receiving, by the second device, a second data definition identifier corresponding to at least one second data definition. Further, the method can also include verifying, using the first device, at least one first data definition using the corresponding received first data definition identifier. Upon verification of at least one first data definition, the method can perform extraction of data from one or more payloads of at least one or more data packets when at least one or more data packets is received from the second device. Upon failing to verify at least one first data definition, the method can prevent extraction of data from one or more payloads of at least one or more data packets when at least one or more data packets is received from the second device. Additionally, the method can also include verifying, using the second device, at least one second data definition using the corresponding received second data definition file identifier. Upon verification of at least one second data definition, the method can perform extraction of data from one or more payloads of at least one or more data packets when at least one or more data packets is received from the first device. Upon failing to verify at least one second data definition, the method can prevent extraction of data from one or more payloads of at least one or more data packets when at least one or more data packets is received from the first device.

In some implementations, the method can also include verifying at least one first data definition using the corresponding received first data definition identifier. Upon verification of at least one first data definition, the method can generate one or more payloads of at least one or more data packets using at least one first data definition. Upon failing to verify at least one first data definition, the method can prevent generation of one or more payloads using at least one first data definition. The method can also include verifying at least one second data definition using the corresponding received second data definition identifier. Upon verification of at least one second data definition, the method can generate one or more payloads of at least one or more data packets using at least one second data definition. Upon failing to verify at least one second data definition, the method can prevent generation of one or more payloads using at least one second data definition.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4a illustrates exemplary components of the data definition files of devices shown in FIGS. 1-3, according to some implementations of the current subject matter

FIG. 5 illustrates an exemplary development environment for generation of data definition files, according some implementations of the current subject matter;

DETAILED DESCRIPTION

To address the deficiencies of currently available solutions, one or more implementations of the current subject matter provide for exchanging and processing of data using data definitions in wireless communication systems, such as, Bluetooth low energy communications.

In some implementations, the current subject matter relates to wireless communications systems that can interpret data packets or data payloads received from wireless communication devices using one or more data definition structures. In some exemplary, non-limiting implementations, the communications systems can include at least one of the following Bluetooth low energy ("BLE") communication system(s), Wi-Fi system(s), wide area network(s) ("WAN"), metropolitan area network(s) ("MAN"), local area network(s) ("LAN"), virtual network(s), virtual local area network(s) ("VLAN"), Internet, intranet, extranet, and/or any other wireless and/or wired network(s) and/or system(s) and/or any combination thereof. The current subject matter system can use one or more data definition structures to process and/or interpret content of one or more data packets/payloads having any type, size, length, etc. and that can originate from and/or be destined for any type of device in the communications system. The size, length, etc. can be fixed and/or variable. In some implementations, the data definition structure(s) can be used to interpret content of data packet(s)/payload(s) relating to a particular software application, but can be independent of a specific device in the communications system on which the software application may be residing/running. This can allow reuse of the data definition structure(s) among multiple devices in the communications system without having to generate separate data definition structure(s) for each device in the communications system or a new device being added to the communications system. In some implementations, the data definition structures can be dynamically edited, selected, and/or used in operation. In the present application, unless specifically noted, the terms "data packet" and "data packets" and "data packet(s)" will be used interchangeably to mean one or more data packets; similarly, the terms "payload" and "payloads" and "payload(s)" will be used interchangeably to mean one or more payloads (whether in the one data packet and/or multiple data packets).

In some implementations, the data definition structures can be generated by a developer of a specific software application and can be transmitted to a device in the communications system that receives data packets/payloads relating to the software application. Once the data definition structure(s) is received by the device, it can be used to unpack a data packet relating to the software application and interpret information contained in the data packet. Once interpreted, the information and/or data contained in the data packet/payload can be forwarded for further processing.

Figure 1:
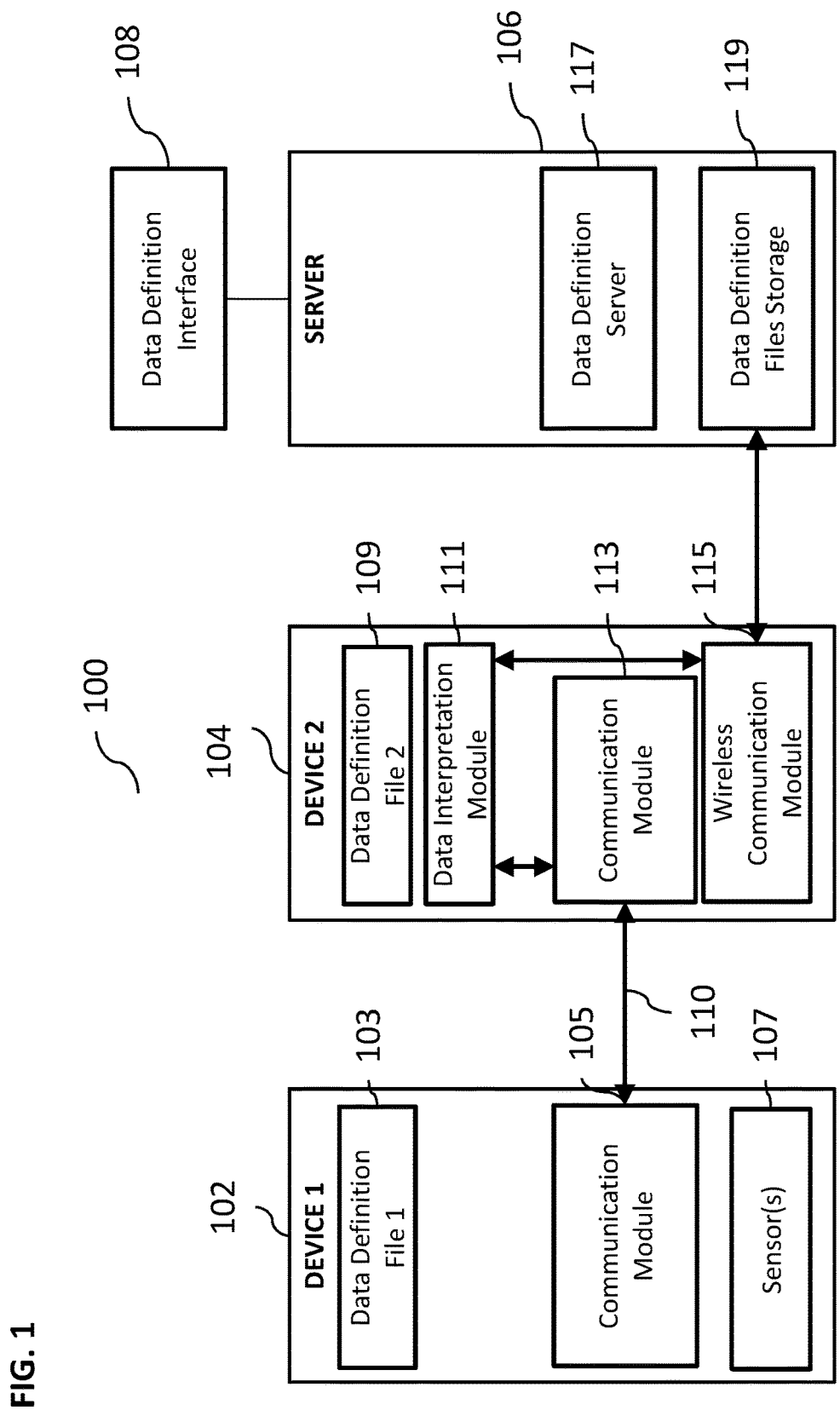
FIG. 1 illustrates an exemplary communications system, according to some implementations of the current subject matter.

FIG. 1 illustrates an exemplary communications system 100, according to some implementations of the current subject matter. System 100 can include device 1 102, device 2 104, a server 106, and a data definition interface 108. By way of a non-limiting illustration only, the system 100 can be a Bluetooth low energy ("BLE") communications system. Other types of communications, including but not limited to wireless, wired, and/or both, can be used. The device 102 can be communicatively coupled to the device 104. The device 102 can be a pairing device, e.g., a sensor, a personal computer, a mobile telephone, a smartphone, a laptop computer, a smartphone, a tablet computer, and/or any other type of device.

The device 104 can be a communications device, e.g., a personal computer, a mobile telephone, a smartphone, a laptop computer, a smartphone, a tablet computer, and/or any other type of device. The device 104 can be communicatively coupled to the server 106 using any wired and/or wireless communications system.

In some alternate implementations, one or more devices 102 and/or 104 can be any computing devices, telephones, wireless telephones, smartphones, tablet computers, personal computers, laptop computers, servers, gateways, networking elements, network of devices, relay or intermediate devices (e.g., devices through which data packets are configured to pass through), endpoint devices, wireless and/or wired speakers, wireless and/or wired receivers and/or transceivers, base stations (e.g., macro, micro, femto, pico, etc. base stations), routers, modems, and/or any other type of devices, and/or any combinations thereof. The following description will refer to "computing devices" and/or "devices" interchangeable, all of which incorporate any and/or all of the above identified devices.

The server 106 can also be communicatively coupled to the data definition interface 108 using any wired and/or wireless communications system. The data definition interface can be disposed on a computing device, which can include a user interface, e.g., a browser, which can be used to generate data definition structures. Devices 102, 104, and server 106 can each include at least one processor, at least one memory coupled to the processor, where the processor can perform various functions (e.g., extraction of data based on data definition files, generation of data definition files, causing devices to transmit data packets, data definition files, etc.), as discussed below.

In a non-limiting, illustrative example and for ease of description, the communications device 104 can be a smartphone and the pairing device 102 can be a temperature sensor. As can be understood, the devices 102, 104 are not limited to these examples and other types of devices can be used. The devices can be communicatively coupled via any wireless, wired, and/or any other type of connection. The sensor 102 can obtain temperature, humidity, date, time, etc., unpack (i.e., extract information contained in the payload) the obtained information in accordance with a data definition structure that can be supplied to the sensor 102, interpret/process the obtained information, and provide the processed information to the smartphone 104 via BLE. The smartphone 104 can perform its own extraction/interpretation/processing of the received data.

As shown in FIG. 1, the device 102 can include a data definition, a data definition file, or a structure 1 (hereinafter, "DDF1") 103, a communications module 105 (e.g., a BLE communications module, and/or any other communications module), and a sensing module 107 (e.g., a sensor). In some implementations, the module 107 can be any device or a network/system of devices (electronic, electric, electro-mechanical, mechanical, optical, etc., and/or any combination thereof), such as a television, a radio, an entertainment system, a speaker, a personal computer, a laptop computer, a server, a gateway, a smartphone, a wireless telephone, a tablet, a receiver, a transmitter, a transceiver, a vehicle, a door lock, an security access point (e.g., an airport security gateway, a public transportation turnstile, etc.), and/or any other device and/or any combination thereof. The sensing module 107 can be coupled to an external device (e.g., a sensor) and/or receive signals from such external device. The communications module 105 can include various hardware, software, and/or any combination of hardware and software that can be used to communicate with device 104. The DDF1 103 can be used to define structure of a payload of a data packet that contains data received from the sensor 107. In some exemplary implementations, the DDF1 103 can be pre-loaded by the manufacturer of the device 102. In alternate exemplary implementations, DDF1 103 can be created at the server 106 using data definition server 117 via data definition interface 108. The DDF1 103 can be also stored by the server 106 in the data definition files storage and/or database 119. The DDF1 103 can be created upon receiving request from device 102, device 104 and/or both. In some implementations, DDF1 can be dynamically generated and received by the devices 102, 104 and/or the server 106 on an as-needed basis.

In some implementations, device 2 104 can include a data definition, a data definition file 2, or a structure (hereinafter, "DDF2") 109, a data interpretation module 111, a communications module 113 (e.g., a BLE communications module, and/or any other wireless communications module), and a wireless communications module 115. The communications module 113 can include various hardware, software, and/or any combination of hardware and software that can be used to communicate with device 102. Device 102 and device 104 can be communicatively coupled using a BLE communications medium, a wireless communication, a wired communication, and/or any other type of communication. The DDF2 109 can be used to unpack a payload of a data packet that contains data received from the device 102. The DDF2 109 can be specifically created for device 104 based on its need to communicate with device 102. In some exemplary implementations, the DDF2 109 can be pre-loaded by the manufacturer of the device 104 (for example, when it is known which devices 102, device 104 intends to communicate with). In alternate exemplary implementations, DDF2 109 can be created at the server 106 using data definition server 117 via data definition interface 108. The DDF2 109 can be also stored by the server 106 in the data definition files storage and/or database 119. The DDF2 109 can be created upon receiving request from device 104, which can indicate that device 104 is intending to communicate with device 102. The server's storage 119 can store information about various devices 102 that a particular device 104 may intend to communicate with and thus, can also store appropriate DDF2s for the purposes of providing them to device 104. In some implementations, similar to DDF1, DDF2 can be dynamically generated and received by the devices 102, 104 and/or the server 106 on an as-needed basis.

In some implementations, data definition files can contain information defining structures of payloads of data packets received by the respective devices, as discussed below. By way of a non-limiting example, a data definition file that can be used to interpret/extract information from a payload of a data packet received from a temperature sensor, can indicate that first 5 bits of the payload of the data packet are designated for temperature, the following 16 bits of the payload are designated for pressure, etc. The data definition files can also be used by the devices (e.g., pairing devices) to extract instructions from payload of data packets received from other devices (e.g., communication devices). By way of a non-limiting example, a data definition file can be used to interpret/extract information from a payload of a data packet received by a temperature sensor, can indicate that first 10 bits are instructions to set date and time, next 10 bits are instructions to switch the temperature sensor device into a measurement mode, etc. The data definition files can be used by the devices' data interpretation modules (e.g., hardware, software, and/or any combination thereof) to extract/interpret information from payloads of data packets received from various devices. The data definition files can be generated by the devices themselves, the server, manufacturer(s) of the devices (and pre-loaded on the devices), and/or any other entities. The data definition files can be generic and/or irrespective of any devices or types of devices, and/or can be specifically created for particular devices, particular types of devices, particular communication medium involving various devices, and/or be any combination thereof. The data definition files can be stored by the server, by the devices, and/or both, and/or be available on demand. The data definition files can also be updated as desired.

When device 104 receives a data packet from device 102, its data interpretation module 111 can extract payload content of the received data packet (e.g., raw data from sensor 107) using on DDF2 109, which can match device 102 data packet payload characteristics. The communication module 113 of the device 104 can communicate with communication module 105 of the device 102 via a communication link 110 for the purposes of receiving and/or transmitting data between the devices 102 and 104. As such, the communication module 113 can receive the data packet from device 102 and then, can forward the received data packet to the data interpretation module 111 for processing. The data interpretation module 111 can interpret and unpack (i.e., extract information contained in the payload) the received data packet using DDF2 109 and format unpacked raw data contained in the payload of the received data packet. The formatted data can be transmitted from device 104 to the server 106 using communication module 115 for storage at the server 106. The server 106 can interpret information contained in the formatted data received from the device 104 using DDF2 109 that is also stored at the server 106.

Figure 2:
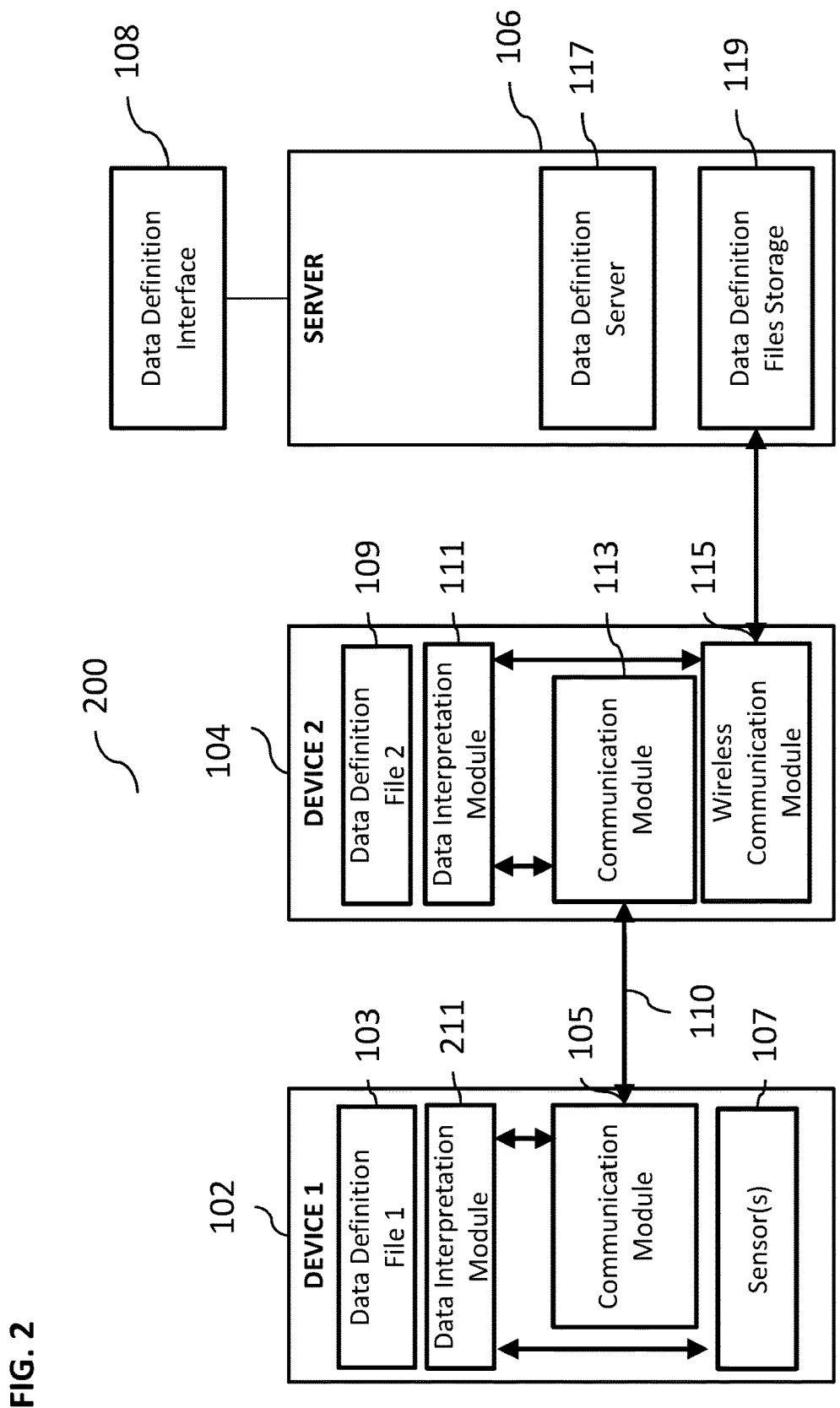
FIG. 2 illustrates an exemplary communications system, according to some implementations of the current subject matter.

FIG. 2 illustrates an exemplary communications system 200, according to some implementations of the current subject matter. System 200 can be similar to system 100 and can include device 102, device 104, server 106, and data definition interface 108. In addition to the components of the device 102 shown in FIG. 1, the device 102 can also include a data interpretation module 211 that can be used to perform functions similar to the data interpretation module 111 of the device 104. In some implementations, one or both devices 102, 104 can include one or more data interpretation modules. The data interpretation module 211 of device 102 can interpret and/or unpack information received from the device 104 using DDF1 103. As stated above, DDF1 103 can be pre-loaded on the device 102 and/or generated on demand by the server 106 (and/or any other component) and provided to device 102 for interpreting/unpacking data received from device 104.

Figure 3:
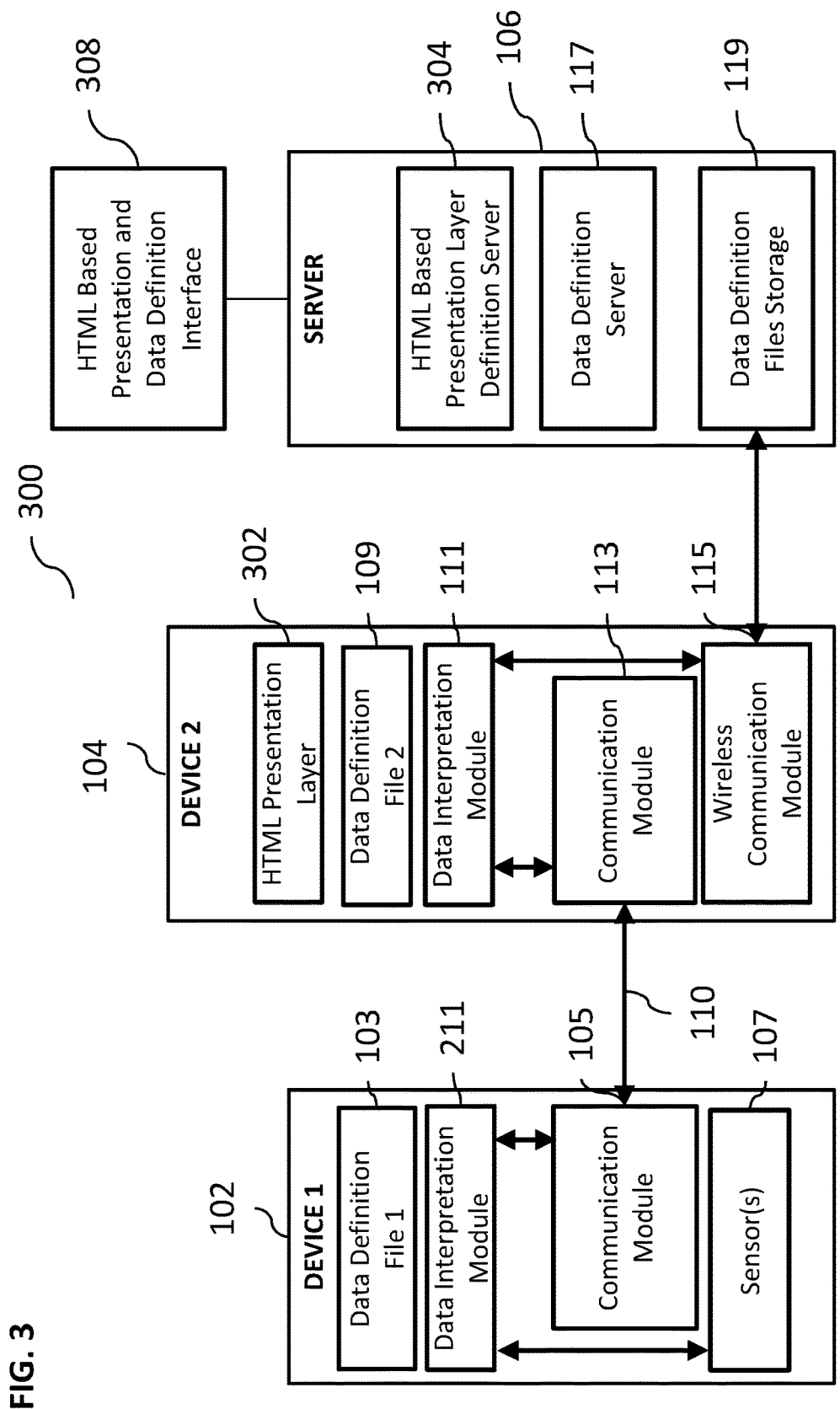
FIG. 3 illustrates an exemplary communications system, according to some implementations of the current subject matter.

FIG. 3 illustrates an exemplary communications system 300, according to some implementations of the current subject matter. The system 300 can be similar to the systems 100 and 200 and can include device 102, device 104, and server 106. Similar to system 200 (shown in FIG. 2), devices 102 and 104 can both include data interpretation module 211, 111, respectively. In addition to components of device 104 shown in FIGS. 1 and 2, device 104 can also include a hypertext markup language ("HTML") presentation layer 302. Further, the server 106 can include an HTML based presentation layer definition server 304, which can be communicatively coupled to the HTML based presentation and data definition interface 308. In some implementations, the above HTML components can include HTML5 and/or interactive HTML pages that can be presented as a user interface on device 104. The HTML presentation layer 302 can include description of text, button(s), graph(s), image(s), video(s), audio(s), etc. that can be presented in the HTML format. The HTML based presentation definition server 304 can serve and/or transmit (for example, on demand) one or more HTML files for the HTML presentation layer 302 to display on the user interface on device 104. The HTML presentation layer 302 can be a web browser that can include HTML data locally and/or can receive HTML data from HTML based presentation definition server 304 (instead of locally storing HTML data in the HTML presentation layer 302) for display. The HTML based presentation definition server 304 can be a web server. The HTML based presentation and data definition interface 308 can be an interface that can be used to build HTML data that can be stored in HTML based presentation definition server 304 and transmitted to HTML presentation layer 302 on demand. Alternatively, the HTML based presentation and data definition interface 308 can be used to build HTML data that can be stored in HTML presentation layer 302 locally.

Figure 4B:
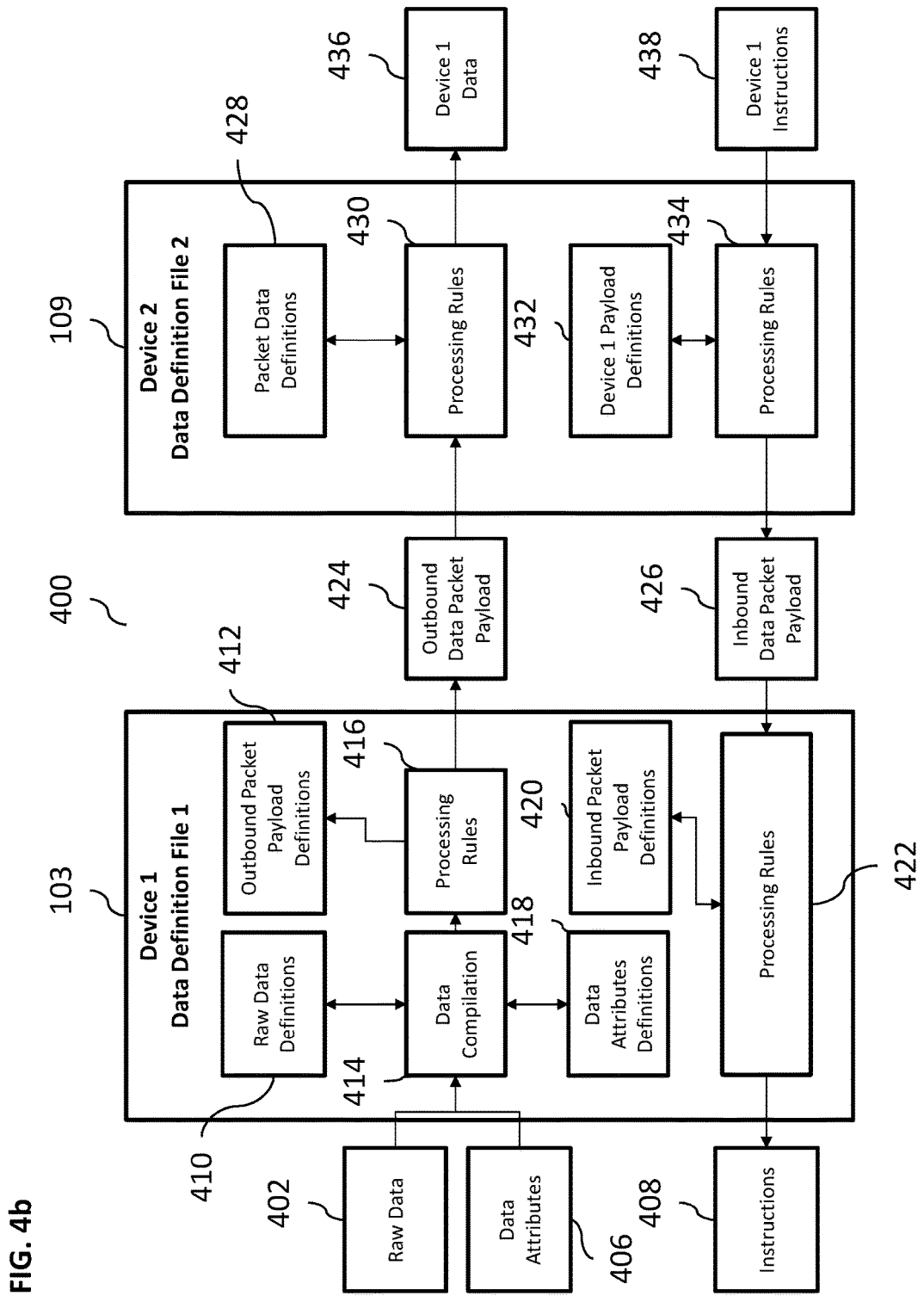
FIG. 4b illustrates exemplary components of the data definition files of devices shown in FIGS. 1-3, according to some implementations of the current subject matter.

In some implementations, the user interface, generated based on HTML presentation layer 302, can provide an interface for performing various transactions and/or operations on the device 104. For example, the HTML presentation layer 302 can display a data synchronization icon or button that can initiate communication between devices 102 and 104. In this exemplary implementation, as shown in FIGS. 4a-b, the HTML presentation layer 302 can interact with device 102's instruction definitions or data definitions to generate an inbound data packet (i.e., packet transmitted to device 1 102), including its payload, and to transmit a request for device 102 to generate an outbound data packet (i.e., packet transmitted to device 2 104), including its corresponding payload, using data definition file 103. Once the outbound data packet is received by device 104, packet data definitions and processing rules of the data definition file 109 can be applied to extract/unpack data contained in the payload of the outbound data packet. If no error is detected in the communications, the HTML presentation layer 302 can perform transmission and display of the data received from device 102, as contained in the payload of the outbound data packet. In some implementations, device 104 can also operate as a gateway to the server 106 (not shown in FIG. 3) and provide data received from device 102 as well as perform its own operations, e.g., providing interactivity, communications, etc. to its user. As can be understood, the current subject matter is not limited to the use of the HTML-based components described above for the purposes of presenting information resulting from processing of data contained in the data packets. Any other mechanisms can be used to trigger a response to the data contained in a data packet (e.g., generation of an audio/video signal, switching a device into a particular mode of operation (e.g., sensing, activating a lock, disarming a security system, etc.). Any interfaces can be used for the purposes of presenting and/or acting on the processed information. In some implementations, the HTML definition (and/or any other type of definitions) can be incorporated into data packets, whereby data definition files can include various instructions to unpack/extract information contained therein.

FIG. 4a illustrates exemplary components of the data definition files 103 and 109 of devices 102, 104, respectively. The DDF1 103 can include data definitions 411 and processing rules 415 for generating an outbound data packet payload 424, as well as data definitions 421 and processing rules 423 for processing inbound data packet payload 426. As shown in FIG. 1, device 102 can obtain data 403 (e.g., a sensor output, and/or any other data that may be outputted by any other device). The data 403 can be determined by the device 102 and/or can be provided by an external device communicatively coupled to the device 102. In the exemplary implementation, where device 102 is a sensor, the sensor data 403 can include sensor measurements, date, time, real-time information, location information, sensor condition information, etc.

In some implementations, the data 403 along with the data definitions 411 (e.g., definitions indicative of how the data 403 should be interpreted/packed/unpacked/etc.) can be processed using processing rules 415 to generate the outbound data packet 424 for transmission to the device 104. The transmission of the packet can occur via any wireless and/or wired communications links (e.g., BLE, WiFi, etc.) and/or any combination thereof. The device 104 can then use its DDF2 109 to unpack/extract information from it. The above definitions and rules can be received from the server (not shown in FIG. 4a) and/or device 104 and/or can be pre-loaded by the manufacturer of device 102.

Once the packet 424 is received by the device 104, device 104 can use its data definitions 429 and processing rules 431 to unpack/extract data from the packet 424 to generate device 1 output 437. The data definitions 429 can include information on how to extract data from the packet 424 and can be specific to a particular device 102. The definitions 429 and the rules 431 can be received from the server (not shown in FIG. 4a) and/or can be generated by the device 104 and/or can be pre-loaded by the manufacturer of device 104.

In some implementations, DDF2 109 can also include data definitions 433 and processing rules 435, which can be used to generate a payload for an inbound data packet 426 to be transmitted to the device 102. The inbound data packet payload 426 can be generated using device 1 input data 439. The data 439 can include, by way of a non-limiting example, instructions to set time/date on the device 102, switch device 102 to measurement mode, etc. The data packet 426 can be transmitted to the device 102 using wireless, wired, and/or any other type of communications and/or any combination thereof. Once the data packet 426 is received by the device 102, the processing rules 423 along with data definitions 421 can be used to unpack/extract instructions from the data packet 426 to generate input data 409 (e.g., which can be sensor input and/or any other input for any other device).

In some implementations, as will be described in further detail below, each data definition file that may be created and/or used can be associated with one or more unique data definition file identifiers ("DDF ID"). The data definition file identifier can be specified for a particular data definition file and can be generated for the data definition file at the time the data definition file is created and/or can be pre-loaded by the manufacturer of the devices 102, 104 (and/or can be provided by an external device that may be communicating with devices 102, 104). In some implementations, the DDF ID can be used by the devices (subsequent to authentication of the device and/or user associated with the device) to request a specific data definition file associated with the DDF ID. The DDF can be verified by a device receiving the DDF ID and an appropriate data definition file can be provided to the requesting device. In some implementations, the DDF ID can be also be used to select and/or identify data definitions and/or processing rules that can be used into creating a data definition file and/or unpacking/extracting data from data packet payload.

FIG. 4*b*, which can be an exemplary variation of FIG. 4*a*, illustrates exemplary components of the data definition files 103 and 109 of devices 102, 104, respectively. The DDF1 103 can include raw data definitions 410, outbound packet payload definitions 412, data compilation definitions 414, processing rules 416, data attributes definitions 418, inbound packet payload definitions 420, and processing rules 422. As shown in FIGS. 1 and 4*b*, device 102 can obtain raw data 402 and data attributes 406, which, in some implementations, can be predetermined when device 102 requests input and/or the sensor initiates transmission of data and attributes to the device 102. In some implementations, appropriate data definition files can be selected based on the raw data 402 and/or data attributes 406. In some implementations, the sensor output 403 (as shown in FIG. 4*a*) can include at least one of the following the raw data 402 and the data attributes 406. By way of non-limiting examples (and for ease of understanding), these (i.e., raw data: data attribute(s)) can include temperature: time of measurement; luminosity: time and condition of measurement, door lock state: door lock ID, make, time; door lock biometric reading: door lock ID, make, time; and/or any others. As can be understood, other types of raw data: data attribute(s) combinations are possible.

In some implementations, raw data definitions 410 can include various data and/or information about raw data header, configuration (e.g., raw data bit length, number of raw data included, etc.), etc. Data attributes definition 418 can include various data and/or information about location of data attributes in the combination of raw data 402 and data attributes 406, data attribute bit length, etc. In some implementations, raw data 402 and/or data attributes 406 can be provided to the device 1 separately from each other and/or simultaneously. In some implementations, data compilation component 414 can combine the received raw data and data attributes if so required.

In some implementations, data compilation component 414 can generate one or more instructions (e.g., function calls, triggers, etc.) to the processing rules component 416 for generating the outbound data packet payload 424. The content and configuration of the outbound data packet payload 424 can be specified using outbound packet payload definitions 412. In some implementations, the data compilation component 414 can also gather/compile all requisite information, data, attributes, states, etc. that may need to be processed for the purposes of generating the outbound data packet payload 424.

In some implementations, the processing rules component 422 can generate instructions 408 by processing inbound data packet payload 426 based on data and/or information provided by inbound packet payload definitions component 420. By way of a non-limiting example, an inbound data packet payload can include data and/or information relating to the time for starting temperature measurements, starting measuring atmospheric pressure, resetting timer on one or more sensor(s), etc., and/or any combination thereof. Based on the inbound packet payload definitions 420, processing rules component 416 can generate one or more instructions (e.g., code) 408 which the sensor(s) can interpret and/or execute. Alternatively, processing rules component 422 can generate individual instructions 408 that the sensor(s) can interpret and/or execute individually.

In some exemplary, non-limiting implementations, the inbound data packet payload 426 can include an instruction to unlock a door through use of an encrypted biometric authentication authorization code that specifies user's biometric signature that should be matched to unlock the door. The processing rules component 422 can parse data and/or information (e.g., instruction to unlock the door, biometric signature, user's identification information, etc.) using inbound packet payload definitions 420 and generate one instruction to the door lock, where the instruction contains a combination of the parsed data and/or information obtained from the inbound data packet payload 426. Alternatively, separate instructions can be provided individually to the door lock for interpretation and execution. In other exemplary implementations, inbound data packet payload 426 can include an automobile driver identifier so that the automobile, upon receiving instructions 408, can perform adjustment of seats, instrumental panel displays, entertainment system setting, air-conditioning, start the ignition, etc. As can be understood, the above are non-limiting, illustrative examples of the inbound instructions and their uses. It is further understood that the current subject matter is not limited to the above exemplary implementations.

The raw data 402 and/or data attributes 406 can be determined by the device 102 and/or can be provided by an external device communicatively coupled to the device 102. In the exemplary implementation, where device 102 is a sensor, the raw data 402 can be a sensor raw data and can include sensor measurements, date, time, etc. Data attributes 406 can include real-time information, location information, sensor condition information, etc.

In some implementations, the raw data 402 and the data attributes 406 can be provided to data compilation 414 along with the raw data definitions 410, which can include information defining how the raw data 402 should be interpreted/packed/unpacked/etc., and data attributes definition 418, which can include information defining how the data attributes 406 should be interpreted/packed/unpacked/etc. The data compilation 414 can compile and/or combine the information from the raw data 402, the data attributes 406 using raw data definitions 410 and the data attributes definition 418. The compiled information can then be further processed using one or more processing rules 416 based on the outbound packet payload definitions 412 to generate an outbound data packet 424 containing payload formed using the definitions 410, 412, 418, and processing rules 416. The outbound data packet 424 is then transmitted to the device 104. The transmission of the packet can occur via any wireless and/or wired communications links (e.g., BLE, WiFi, etc.) and/or any combination thereof. The device 104 can then use its DDF2 109 to unpack/extract information from it. The above definitions and rules can be received from the server (not shown in FIG. 4*a*) and/or device 104 and/or can be pre-loaded by the manufacturer of device 102. In some implementations, a data definition file identifier for a data definition file can be specified based on information/data/functionality/function/etc. that the device 1 102 may be provided with and/or instructed to perform. For example, data attributes 406 and/or inbound data packet payload 426 can include an appropriate DDF ID that can identify specific data definition file that the device 1 102 is supposed to use. The device 1 102 can use the supplied DDF ID to confirm that a correct data definition file is to be applied to the input that it may receive as raw data 402/data attributes 406 and/or inbound data packet payload 426. In some implementations (as will be discussed further below), in a scenario where a DDF ID does not match a DDF that a device has received and/or already has stored, or the device does not the correct DDF or any DDF that may be needed, the device can transmit a request to another or second device and/or a server to request the correct DDF. If neither the second device nor the server have the right DDF, the DDF can be dynamically generated (e.g., based on the parameters that can be provided by the device and/or associated with the data packet payload that may need to be unpacked). The second device can also serve as an intermediary with yet another (third) device and/or server in passing the first device's request and/or transmitting the requisite DDF. In some implementations, a shared key that may be shared by devices 1 and 2 (as discussed below) can be used to provide appropriate information as to which data definition files are supposed to be used. Alternatively, the shared key can incorporate a DDF ID that can specify a particular data definition file that is to be used by a device.

Once the packet 424 is received by the device 104, device 104 can use its packet data definitions 428 and processing rules 430 to unpack/extract data from the packet 424 to generate device data 1 436. The data definitions 428 can contain information on how to extract data from the received packet 424 and can be specific to a particular device 102. The definitions 428 and the rules 430 can be received from the server (not shown in FIG. 4*a*) and/or can be generated by the device 104 and/or can be pre-loaded by the manufacturer of device 104.

In some implementations, DDF2 109 can also include device 1 payload definitions 432. Processing rules 434 with device 1 payload definitions 432 can be used to generate a payload for an inbound data packet 426 to be transmitted to the device 102. The inbound data packet payload can be prepared based on device 1 instructions 438. The instructions can include, by way of a non-limiting example, instructions to set time/date, including new time/date data on the device 102, switch device 102 to measurement mode, etc. The data packet 426 can be transmitted to the device 102 using wireless, wired, and/or any other type of communications and/or any combination thereof. Once the data packet 426 is received by the device 102, processing rules 422 along with inbound payload packet definitions 420 can be used to unpack/extract instructions from the data packet 426 to generate instructions 408.

Similarly to the above, data definition file identifier identifying a particular DDF2 that is to be used by the device 2 104 can be supplied to device 2 104. For example, the outbound data packet payload 424 (which can be transmitted over multiple data packets) can include an appropriate DDF2 ID to ensure that the device 2 104 processes the received outbound data packet payload 424 correctly. In case of multiple data packets transmitting one data payload, the DDF identifier can be included in one or more or all of the data packets, where the DDF identifier can reference all data packets in the payload to ensure that appropriate data definitions are applied to all packets. In some implementations, to ensure that appropriate DDF IDs are received by the devices, device 1 instructions 438 can include DDF identifiers for both device 1 and device 2. Once received by the device 2, the DDF2 identifier for device 2 can remain with the device 2 and DDF1 identifier for device 1 can be included into the inbound data packet payload 426 (which can also be transmitted over multiple data packets, whereby DDF1 ID can be incorporated into one or more or all of the data packets and/or reference all packets in the transmission).

In some implementations, if an incorrect DDF ID (e.g., a DDF ID does not match to the DDF) is found to be on one or more of the devices (and/or if a DDF ID which does not match to the DDF is supplied to one or more of the devices), the devices can communicate with one another and/or a server (not shown in FIG. 4*b*) to request an appropriate DDF. For example, if device 1 has received a DDF ID that does not match the DDF, the device 1 can communicate with device 2, which, in turn, can request the appropriate DDF ID and/or DDF from a server and/or any other entity that may be communicatively coupled with device 1 and/or device 2 (alternatively, device 1 can communicate with the server/entity directly). In some implementations, the devices 1 and/or 2 can store and/or can be provided with (upon request and/or automatically and/or by a manufacturer) with data definition files (i.e., DDF1 and DDF2) for both devices and/or data definition file identifiers for both data definition files (i.e., DDF1 ID and DDF2 ID). This way, one device can request appropriate DDFs and/or DDF IDs from the other device without involving a server and/or another entity. In some implementations, DDF IDs (and/or DDFs) can be included in and/or referenced by shared keys (as discussed below) that may be shared by the devices 1 and 2, whereby DDF IDs (and/or DDFs) can be provided together with the shared keys and/or subsequently to the sharing of the shared keys. In some implementations, DDFs and/or DDF IDs can be updated by one or more devices and/or servers/entities (communicatively coupled to one or more devices). Upon determination of an update to DDFs and/or DDF IDs, the device/server/entity that has received an updated DDFs and/or DDF ID can transmit appropriate notification to other device/server/entity to ensure that all components in the system have up to date information.

FIG. 5 illustrates an exemplary development environment 500 for generation of data definition files, according some implementations of the current subject matter. The environment 500 can be implemented at design time of the communication systems discussed above (e.g., systems 100, 200, 300 shown in FIGS. 1-3, respectively). The environment 500 can include a device 1 development environment 502, a device 2 development environment 504, and a server 106 communicatively coupled to an interface 108. The environment 502 can include a DDF1 503 (having a corresponding DDF1 ID), a DDF1 development module 507, and a communication module 505. The communication module 505 can receive data from an external device (e.g., a sensor device as shown in FIG. 5). The modules 505 and 507 can include hardware, software, and/or any combination thereof. The module 507 can be used to generate the DDF1 503 based on the information received from the server 106.

The environment 504 can include DDF2 509 (having a corresponding DDF2 ID), DDF2 development module 506, communication module 513, and a wireless communication module 515. The communication module 507 can receive data from communication module 505. The wireless communication module 515 can be communicatively coupled to the server 106. The server 106 can include a server database 517 that can store data definition files, information about devices 102, 104, and/or any other information that can be used to generate data definition files. The modules 506 and 513 can include hardware, software, and/or any combination thereof. The module 506 can be used to generate the DDF2 509 based on the information received from the server 106. In some implementations, the server 106 can also store and/or be provided with DDF1 ID and DDF2 ID along with corresponding DDF1 and DDF2.

In some implementations, DDF1 and/or DDF2 (along with respective DDF IDs) can be generated using at least one of the following device 102, device 104, server 106 (e.g., using interface 108, database 517, etc.), and/or any using any other device (e.g., they can be preloaded on one or more devices). The DDF1 and/or DDF2 (along with respective DDF IDs) can be transmitted to and/or installed on the respective devices 102, 104 and/or on both devices. This can be accomplished using the development modules 506 and/or 507, which can receive and/or transmit capabilities. Additionally, both modules 506, 507 can also detect errors in the data definitions and/or processing rules as well as generate and transmit report(s) indicative of such errors. The errors can be corrected through validation and/or testing procedures, as discussed below with regard to FIG. 6.

Figure 6:
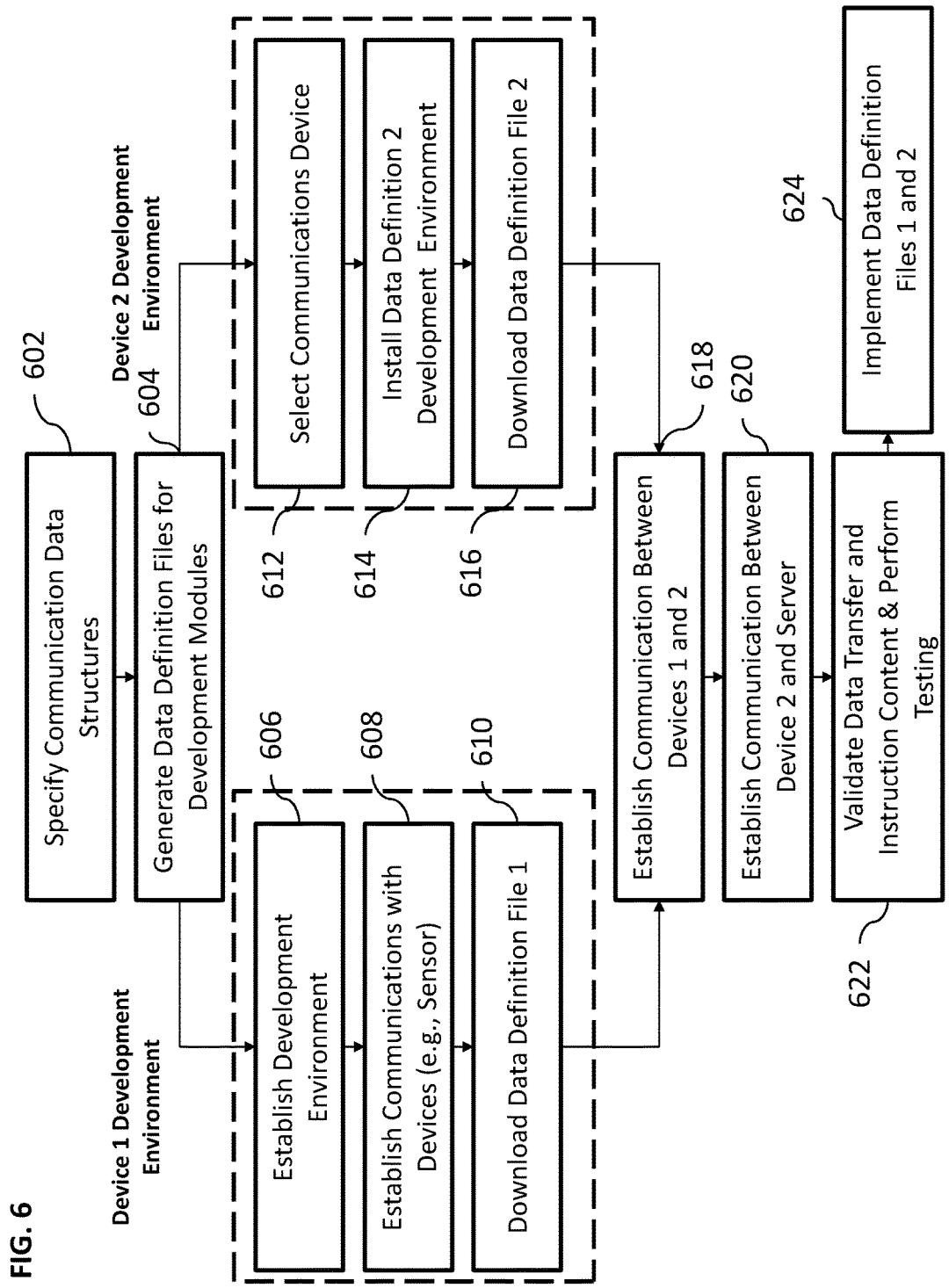
FIG. 6 illustrates an exemplary process for generating data definition files using system shown in FIG. 5, according to some implementations of the current subject matter.

FIG. 6 illustrates an exemplary process 600 for generating data definition files using system 500 shown in FIG. 5, according to some implementations of the current subject matter. The process 600 can be performed at design time of the communication system (e.g., systems 100, 200, 300, shown in FIGS. 1-3, respectively). The process 600 can be initiated via a browser interface, such as interface 108, and a server (e.g., a cloud server), such as server 106, as shown in FIG. 5. A developer can initiate and/or create and/or setup a development account for developing data definition files. At 602, a communication data structure/interface can be specified for communication between the sensor 501 (and/or any other device that can be incorporated into device 1 and/or be communicatively coupled to the device 1) and communication module 505. A communication data structure/interface can be also specified between the communication module 513 and the device 2. In some implementations, communication modules in 505 and 513 can include built-in functionalities for executing low level functions (such as those specified the Bluetooth specification), including broadcasting of advertising packets, transmitting back-connect request(s), etc. In some cases, preset communication profile(s) (e.g., preset BLE profile(s)), which specify packet payload structure, can be used. These profiles are typically fixed and cannot be altered to ensure interoperability. By way of a non-limiting example, if a blood pressure monitor uses a standard BLE profile, a smartphone application may only need to know which BLE standard profile is being used to receive data from the blood pressure monitor. While such profile is designed to cover all the information the blood pressure monitor would transmit, in many cases, such BLE profile would not sufficient. The current subject matter provides a solution to the use of such standard BLE profile(s). In particular, it provides an ability to design and build a data payload structure by simplifying coding, compiling/integrating codes, verification and testing in real-time environment. Another advantage of the current subject matter is that it enables connectivity function development in a simpler, faster, and cheaper way.

At 604, data definition modules 507 and 506 can be initiated/setup, which can include creating and/or providing appropriate development software applications to the respective development environments 502 and 504 from the server 106. Further, a DDF ID can be generated and/or assigned/associated with the DDF (or vice versa) and can be used for the purposes of tracking changes/revisions to the DDF. Such development software applications can be created using the interface 108, which can transmit them to the development environments 502 and 504 of devices 1 and 2, respectively. Additionally, data definition files 503 and 509 can be also generated and can be transmitted to the development environments 504, 506, of devices 1 and 2, respectively. Once the data definition files have been transmitted to the development environments, the development process 600 can proceed in devices 1 and 2 separately.

In the device 1 development environment, at 606, a development environment of device 1 can be established. This can involve selection of the communication module 505 (e.g., a BLE communication module) and an appropriate development board. At 608, a connection can be established between the sensor device 501 (and/or any other device that can be incorporated into device 1 and/or be communicatively coupled to the device 1) and the communication module 505. At 610, the data definition file of device 1 (i.e., DDF1) can be downloaded using the communication module 505. The DDF1 can be downloaded from the server 106. In alternate exemplary embodiments, the DDF1 can be downloaded from device 2.

In the device 2 development environment, at 612, a development environment of device 2 can be established. This can involve selection of a communication device (e.g., a smartphone, a tablet, a smart speaker, any other device disclosed herein, etc.). At 614, data definition file 2 development module 506 can be initiated/setup. This can involve downloading a development software application from the server 106. At 616, the data definition file of device 2 (i.e., DDF2) can be downloaded using the communication module 515. The DDF2 can be downloaded from the server 106 and installed on device 2, which can be accomplished without use of the communication module 515. In some implementations, an authentication (e.g., a login) may be required to download DDF1 and/or DDF2 and/or respective development software applications. This can prevent unauthorized access and use of DDF1 and DDF2. In alternate exemplary embodiments, the DDF1 can be downloaded to device 2 from the server 106 and/or from device 1, such as to keep track of which DDF1 is used with which DDF2.

Once the DDF1 and DDF2 have been downloaded to devices 1 and/or 2, the development process 600 can proceed to validation and testing, at 618-624. At 618, a communication can be established between development modules 507 and 506 of devices 1 and 2, respectively. This communication can be established using communication modules 505 and 513 of devices 1, 2, respectively (e.g., BLE communication modules, and/or any other wireless and/or wired modules). At 620, a communication can be established between development environment module 506 and the server 106. This can be accomplished using the communication module 515 (e.g., a wireless and/or wired communication module). At 622, once the communication links between appropriate development modules and the server are established, a validation of data transfer and instruction(s) content can be performed. Additionally, testing of various scenarios can be run to ensure integrity and/or robustness of communication. The testing can involve ensuring that the devices are able to properly pack data and/or properly unpack/extract data from data packets using appropriate DDFs. Once the testing has been successfully completed, DDF1 and DDF2 can be used by devices 1 and 2 at runtime (i.e., in the production system), at 624. In some implementations, the process 600 can be simulated on one device and/or computing system (e.g., a distributed computing system, a cloud, etc.). The device and/or the computing system can be separate from devices 1 and 2 and/or the server that is communicatively coupled to the devices 1 and 2. In this case, DDF1 and DDF2 can be generated and/or tested by such device and/or computing system and then supplied to devices 1 and/or 2 and/or the server. Further, DDF IDs associated with the DDFs can also be generated and/or supplied to the devices.

Figure 7A:
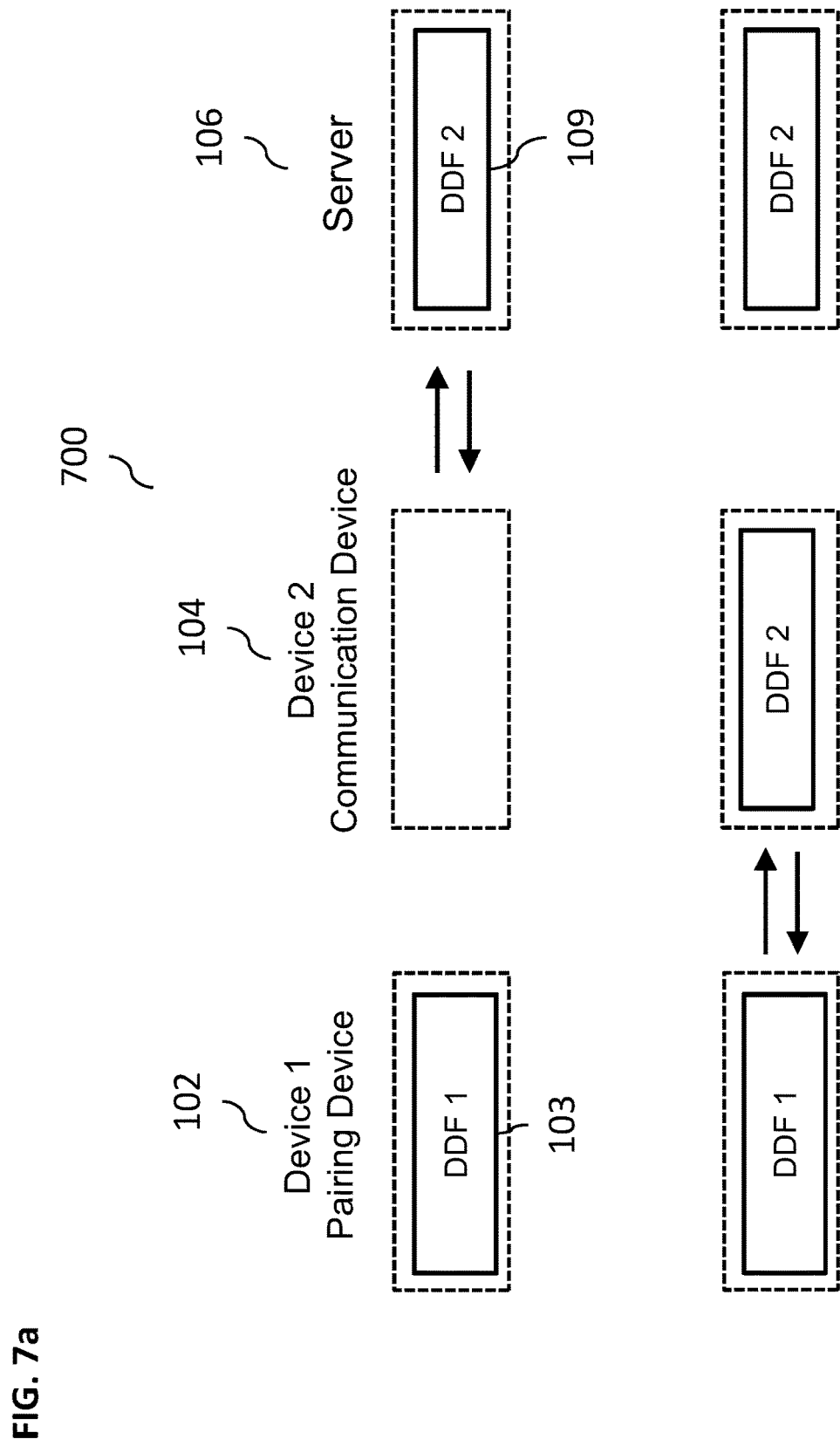
FIG. 7a illustrates an exemplary process for communication between two devices, according to some implementations of the current subject matter.

FIG. 7a illustrates an exemplary process 700 for communication between two devices, according to some implementations of the current subject matter. The process 700 can include communications between device 1 (e.g., a pairing device) 102, device 2 (e.g., a communication device) 104, and a server 106. In this process, device 102 can already have data definition file 1 103 pre-loaded on it and device 104 can be a new device that desires to communicate with device 102. As shown in the top portion of FIG. 7a, device 104 (and/or its user) can request the server 106 to provide it with a data definition file 2 109. This can be accomplished upon device 104 providing appropriate credentials (e.g., entry on device 104's user interface of a login to a user's account stored on the server 106 and/or providing any such credentials automatically (e.g., without manual entry of login credentials)) to the server 106. Upon validating the credentials, the server 106 can transmit DDF2 109 to the device 104. Alternatively, no credentials may be needed to receive DDF2 109 from the server. Also, as stated above, DDF2 109 can be pre-loaded on device 104. In some implementations, DDF1 and/or DDF2 can be specifically designed for use by devices 1 and 2 to extract data from payloads of one or more data packets received from one another (e.g., where data is received in multiple data packets/payloads). Alternatively, DDF1 and/or DDF2 can be generic. Once the device 2 receives DDF2, a communication link can be established between device 1 and device 2 (e.g., a BLE communication link, a wireless communication link, a wired communication link, and/or any other type of link), as shown by the bottom portion of FIG. 7a. In some implementations, such as in a BLE communication environment, device 102 can be configured to broadcast an advertising data packet that can include information about the required DDF2. Based on the information contained in the broadcast advertising data packet, device 104 can request DDF2 from the server 106. In some cases, information concerning DDF2 can also be provided by the data packet once the connection between device 102 and 104 has been established. An exemplary implementation of advertising packet broadcast is discussed in the co-owned, co-pending U.S. patent application Ser. No. 14/992,642 to Yamada, filed Jan. 11, 2016 and entitled "Selective Pairing of Wireless Devices Using Shared Keys", which claims priority to U.S. Provisional Appl. No. 62/194,939, filed Jul. 21, 2015, the disclosures of which are incorporated herein by reference in their entireties. As can be understood, the system 700 and processes performed by the system 700 can be implemented in any communication environment that can include any type of devices, including, but not limited to, any computing devices, telephones, wireless telephones, smartphones, tablet computers, personal computer, laptop computers, servers, gateways, networking elements, network of devices, relay or intermediate devices (e.g., devices through which data packets are configured to pass through), endpoint devices, wireless and/or wired speakers, wireless and/or wired receivers and/or transceivers, base stations (e.g., macro, micro, femto, pico, etc. base stations), routers, modems, and/or any other type of devices, and/or any combinations thereof.

Figure 7B:
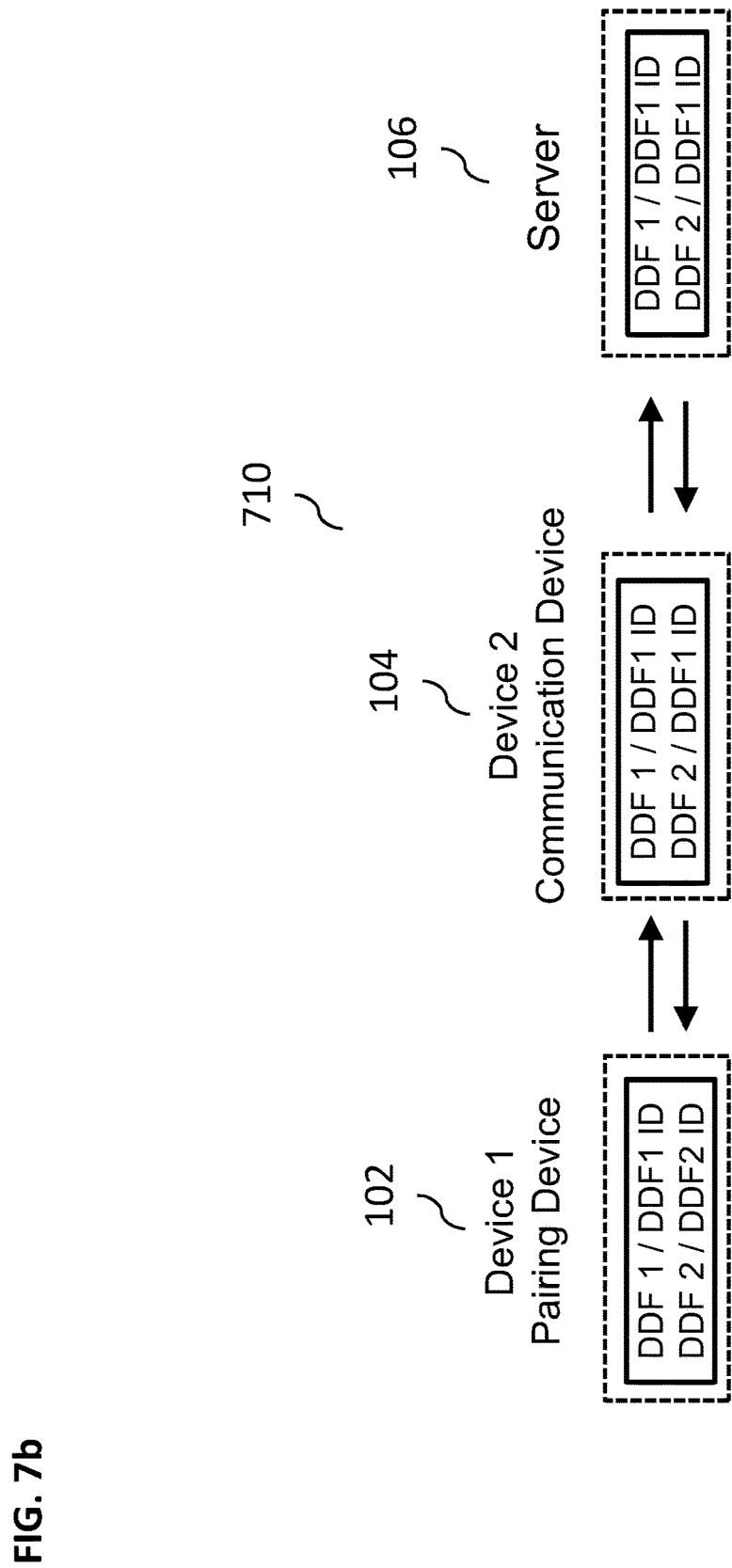
FIG. 7b illustrates an exemplary process for communication between two devices, including exchanging of data definition files and/or data definition file identifiers, according to some implementations of the current subject matter.

In some implementations, devices 1 and/or 2 and/or the server 106 can include and/or be provided with one or both or the other data definition files. Devices/server can provide such DDFs to the other device (for example, upon request). For instance, as shown in FIG. 7b, device 1 may request a DDF1 from device 2 (e.g., device 1 might not have DDF1 due to DDF1 not being supplied, generated, becoming corrupt, etc.), and similarly, device 2 may request DDF 2 from device 1. Devices 1 and/or 2 and/or server can use appropriate DDF IDs to determine that a correct data definition file has been supplied to them. The DDF IDs can be pre-supplied to each device/server and/or can be requested from the other device/server, as shown in FIG. 7b. Further, while the discussions in the present application illustrate one device requesting data definition file from another device (e.g., device 1 requests DDF1 from device 2, which in turn requests it from the server 106, as shown, for example, in FIG. 8a), it should be understood that one or all devices in the current subject matter's system can generate/store and/or can be provided with and/or can request data definition files and/or data definition file identifiers for the other devices in the system.

Figure 8A:
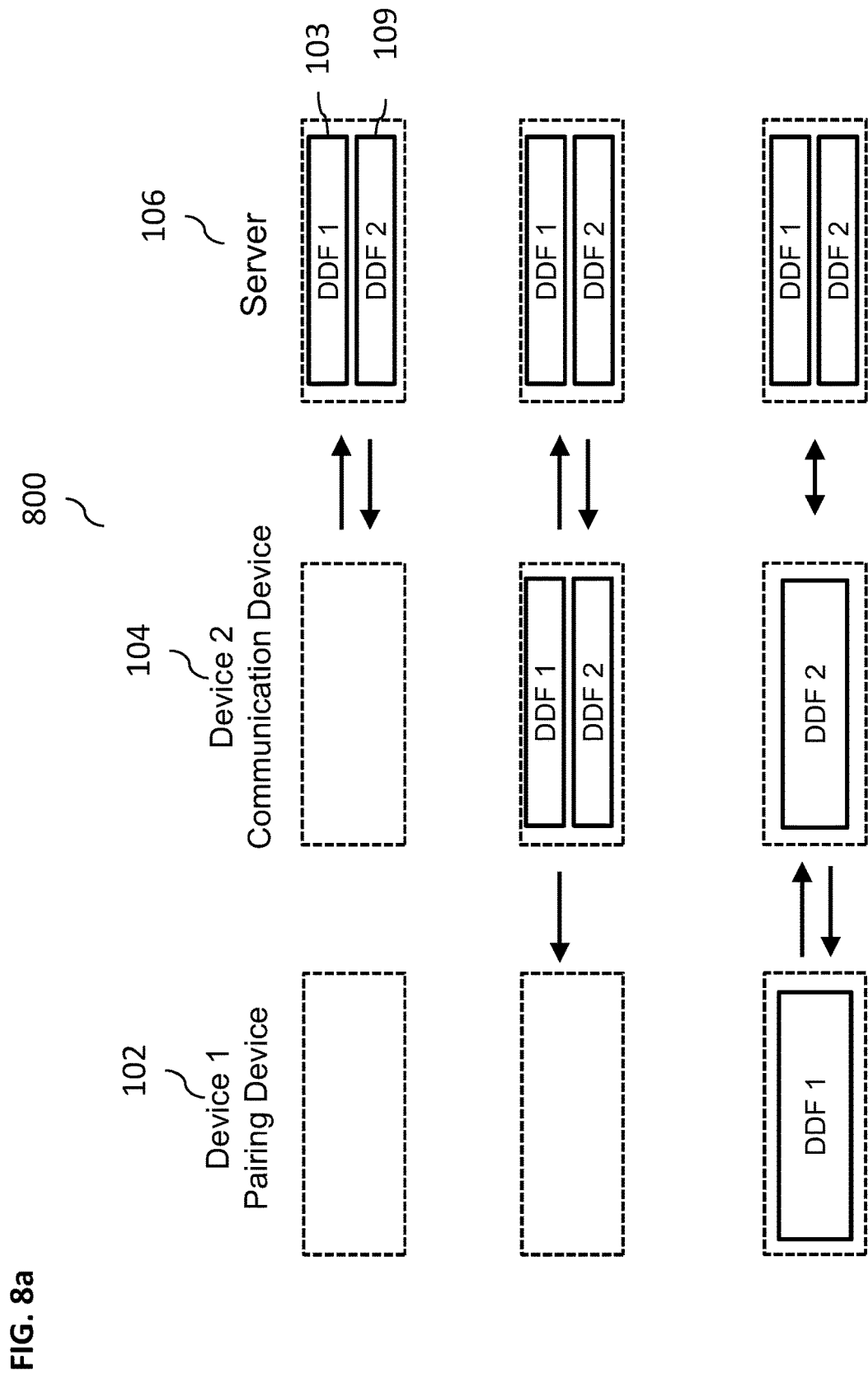
FIG. 8a illustrates an exemplary process for communication between two devices, according to some implementations of the current subject matter.

FIG. 8a illustrates an exemplary process 800 for communication between two devices, according to some implementations of the current subject matter. The process 800 (similar to process 700) can include communications between device 1 (e.g., a pairing device) 102, device 2 (e.g., a communication device) 104, and a server 106. In this process, devices 102 and 104 can be new devices that desire to communicate with one another. As shown in the top portion of FIG. 8a, device 104 (and/or its user) can request the server 106 to provide it with DDF1 103 and DDF2 109. This can be accomplished upon device 104 providing appropriate credentials (e.g., entry on device 104's user interface of a login to a user's account stored on the server 106) to the server 106. Upon validating the credentials, the server 106 can transmit DDF1 103, DDF2 109 to the device 104. Alternatively, no credentials may be needed to receive DDF2 109 from the server.

Once device 104 receives DDF1 and DDF2, device 104 can initiate communication with device 102 (e.g., over-the-air, and/or in any other way) and transmit DDF1 103 to device 102, as shown by the middle portion of FIG. 8a. Once device 102 has received DDF1 103, device 104 can initiate communications with device 102 using DDF2 109, as shown by the bottom portion of FIG. 8a. As can be understood, the system 800 and processes performed by the system 800 can be implemented in any communication environment that can include any type of devices, including, but not limited to, any computing devices, telephones, wireless telephones, smartphones, tablet computers, personal computer, laptop computers, servers, gateways, networking elements, network of devices, relay or intermediate devices (e.g., devices through which data packets are configured to pass through), endpoint devices, wireless and/or wired speakers, wireless and/or wired receivers and/or transceivers, base stations (e.g., macro, micro, femto, pico, etc. base stations), routers, modems, and/or any other type of devices, and/or any combinations thereof.

Figure 8B:
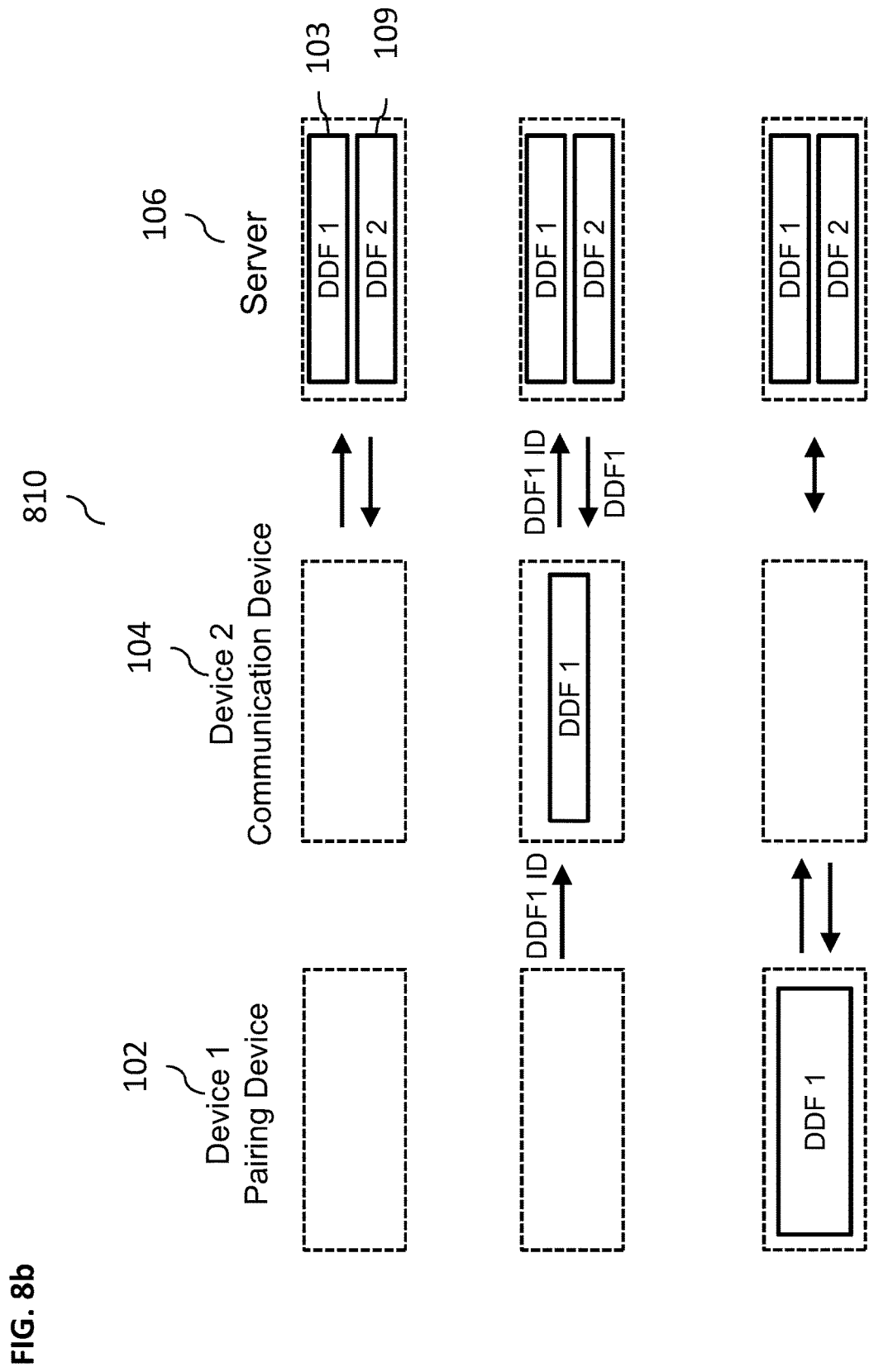
FIG. 8b illustrates an exemplary process for communication between two devices, according to some implementations of the current subject matter.

FIG. 8b illustrates an exemplary process 810 for communication between two devices, according to some implementations of the current subject matter. The process 810 can be performed in connection with any of the processes described herein. It can be used to exchange/receive data definition files based on a specific data definition identifier that may be transmitted by a device. As shown in FIG. 8b, the device 1 102 can be communicatively coupled to device 2 104, which can be communicatively coupled to the server 106. As can be understood, device 1 102 can be directly coupled to the server 106 and/or device 104 only. As shown in FIG. 8b, the server 106 can include copies of the data definition files 1 103 and 2 109. Device 1 102 can transmit a request to device 2 104 to obtain a copy of the data definition file 1 103. In the request, the device 1 can transmit a data definition file 1 identifier (DDF1 ID). Upon receiving the request and DDF1 ID, the device 2 104 can transmit a request along with the DDF1 ID to the server 106 to obtain a copy of the DDF1 103. The server 106 can then transmit the DDF1 103 to the device 2 104, which in turn, can transmit it to the device 1 102. The device 1 102 can use DDF1 ID to verify that a correct DDF1 was received. Alternatively, device 2 104 can store a copy of the DDF1 and device 1 102 can request it from device 2 directly (i.e., without further transmission to the server 106). In yet another alternate implementation, the device 1 102 can transmit the request for DDF1 to the server 106 directly. Similarly, device 2 104 can transmit a request to device 1 102 and/or server 106 for a copy of data definition file (e.g., DDF1 and/or DDF2). The request can include an appropriate data definition file identifier. Further, devices can transmit to each other copies of data definition files, whereupon receipt of the data definition files, the receiving devices can use data definition file identifiers to verify that correct copies of the data definition files were received. The above processes can be performed as part of and/or before and/or after authentication of devices with the server and/or each other.

Figure 9A:
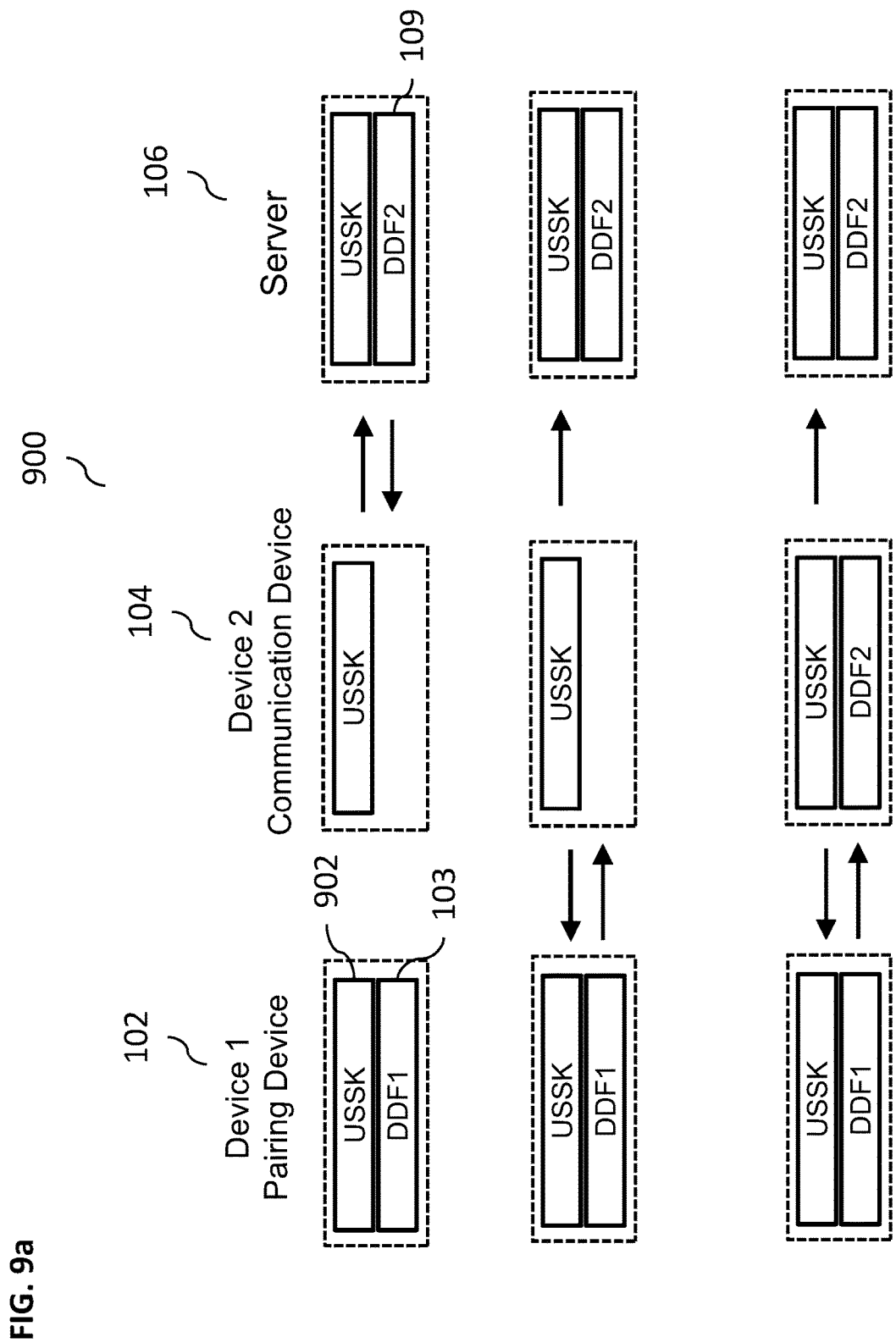
FIG. 9a illustrates an exemplary process for communication between two devices, according to some implementations of the current subject matter.

FIG. 9a illustrates an exemplary process 900 for communication between two devices, according to some implementations of the current subject matter. The process 900 (similar to processes 700, 800, 810 described above) can include communications between device 1 (e.g., a pairing device) 102, device 2 (e.g., a communication device) 104, and a server 106. In this process, device 102 can include a user-specific shared key ("USSK") and/or a global shared key ("GSK") 902 along with DDF1 103 and/or appropriate DDF ID (e.g., DDF1 ID and/or DDF2 ID). In some implementations USSK/GSK 902 can include DDF1 ID and/or DDF1 ID can be provided separately. In some implementations, one or more components of shown in FIG. 9a can be components of a communications network (e.g., gateways, servers, other computing devices, etc.) and can be registered with the network (e.g., included in a network database component that can store information (e.g., addresses, etc.) about components of the network). USSK/GSK are discussed in the co-owned, co-pending U.S. patent application Ser. No. 14/992,642 to Yamada, filed Jan. 11, 2016 and entitled "Selective Pairing of Wireless Devices Using Shared Keys", which claims priority to U.S. Provisional Appl. No. 62/194,939, filed Jul. 21, 2015, the disclosures of which are incorporated herein by reference in their entireties. Use of USSK 902 (or GSK) can further ensure security of communications between the two devices. In this process, server 106 can store USSK 902 (or GSK) and can provide the USSK 902 to the device 104 upon receiving an appropriate request from device 104 (e.g., user of device 104 logging into user's account stored on the server 106, and/or device 104 can be automatically/manually providing its information/credentials to the server 106 without user input, and/or using any other mechanisms). Alternatively, the server 106 does not need to store USSK 902, where the USSK 902 can be shared by device 102, 104 only. As stated above, DDF IDs can also be provided by the devices 102, 104 to each other without involving the server 106.

Once device 104 receives the USSK 902, the device 104 and device 102 can be capable of and/or configured to initiate and/or establish communication (e.g., a BLE communication, a wireless and/or wired communication connection, etc.). Device 104 can then send USSK 902 to device 102. Alternatively, the USSK can be sent prior to establishing any communication. Upon receiving USSK 902 from device 104, device 102 can break its stealth mode and can start transmitting DDF2 109 requirement information/data to device 104. After receiving such information from device 102, device 104 can transmit a request to server 106 to provide it with DDF2 109, as shown by the middle portion of FIG. 9a.

The server 106, after receiving request for DDF2 109 from device 104, can transmit DDF2 109 to device 104. Once device 104 receives DDF2 109, it can communicate with device 102 and DDF1/DDF2 can be used for unpacking/extracting data from payloads of data packets, as shown by the bottom portion of FIG. 9a. Appropriate DDF IDs can be used to request DDFs and/or verify that correct versions of DDFs were received and/or have been transmitted.

In some alternate implementations, the server can provide both USSK 902 and DDF2 109 at the same time if credentials provided by a user using device 104 validate a need to provide both USSK 902 and DDF2 109. As soon as devices 102 and 104 establish a communication link using USSK 902, devices 102 and 104 can start exchanging data and/or instructions using DDF1 and DDF2.

Figure 9B:
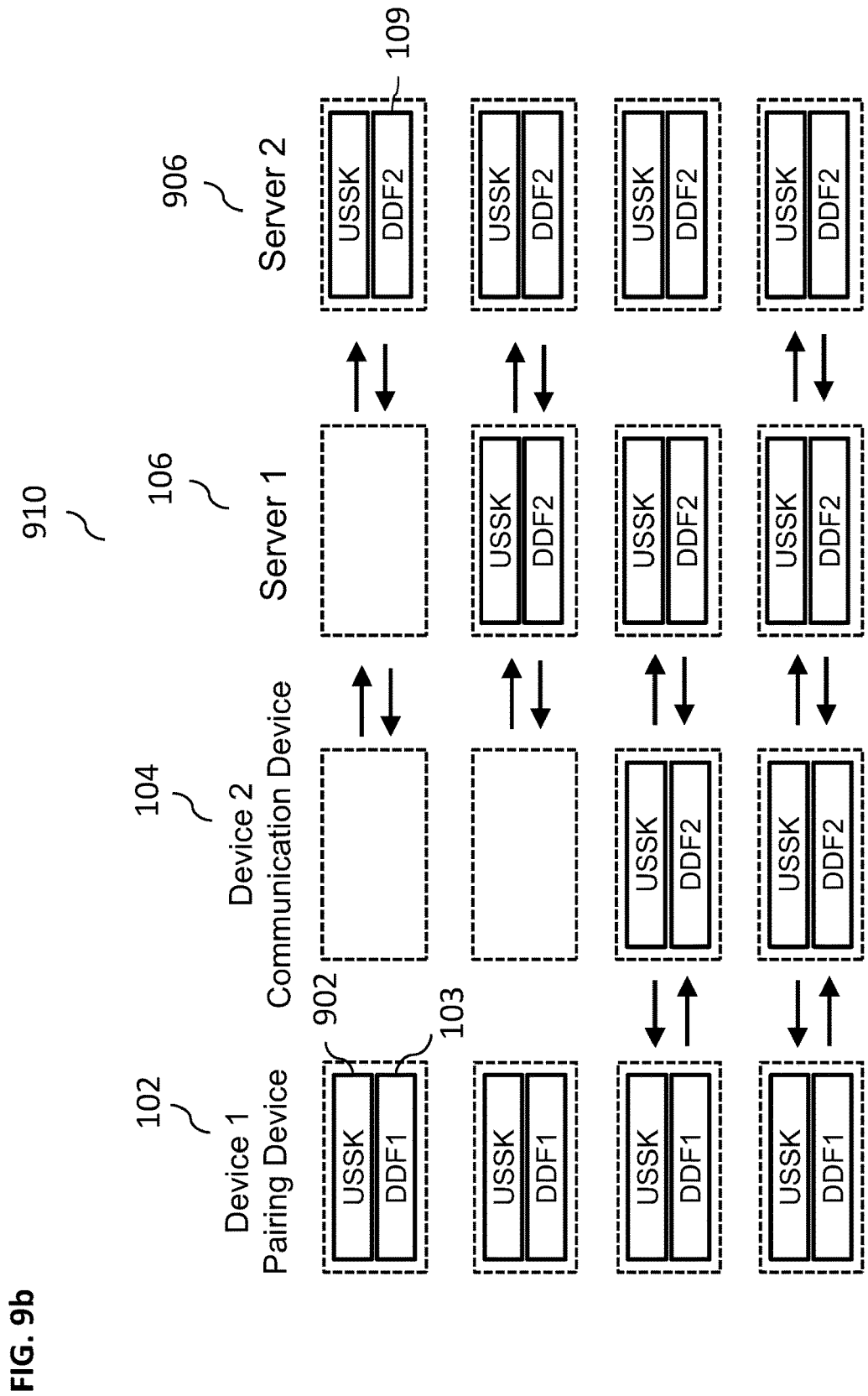
FIG. 9b illustrates an exemplary process for communication between two devices, according to some implementations of the current subject matter.

FIG. 9b illustrates an exemplary process 910 for communication between two devices, according to some implementations of the current subject matter. The process 910 can be used in situations where multiple servers (e.g., servers 106 and 906) are used. The process 910 can allow transmission of USSK/GSK 902 between servers 106 and 906. The transmissions can be secure and can be initiated upon the user providing valid identification and/or authentication credentials.

As shown in the first row of FIG. 9b, device 102 can include USSK 902 and DDF1 103 and server 2 906 can include the USSK and DDF2 109. USSK 902 can be used for connection of devices 102, 104 and/or servers 106, 906. DDF1 103 and DDF2 109 can be used by devices 102, 104 for communication purposes (in accordance with the discussion above). As shown by the second row of FIG. 9b, server 906 can be authorized (e.g., by a user submitting appropriate credentials and/or authentication (e.g., a user having to login into user's online retailer account), and/or credentials/authentication information can be provided without user's input) to transmit USSK 902 and DDF2 109 to server 106. Once the USSK 902 and DDF2 109 are transmitted to server 106, server 106 can perform authentication of the user that authorized transmission of USSK 902 and DDF2 109 from server 906 to server 106. The user can be authenticated to use device 104. Device 104 then receives USSK 902 and DDF2 109 from server 106, as shown by the third row in FIG. 9b. As shown by the fourth row in FIG. 9b, device 104 can then broadcast an advertising packet with the USSK 902 and can be connected to device 102 for communication using DDF1 and DDF2. Similar to the above, appropriate DDF IDs can be used to request DDFs from any of the servers and/or devices shown in FIG. 9b and/or verify that correct copies of DDFs have been received and/or transmitted. Further, the DDF IDs can be transmitted using USSK (e.g., can be included in the USSK) or without use of the USSK. Any data and/or instructions can be exchanged between all devices 102, 104 and servers 106, 906.

Figure 10:
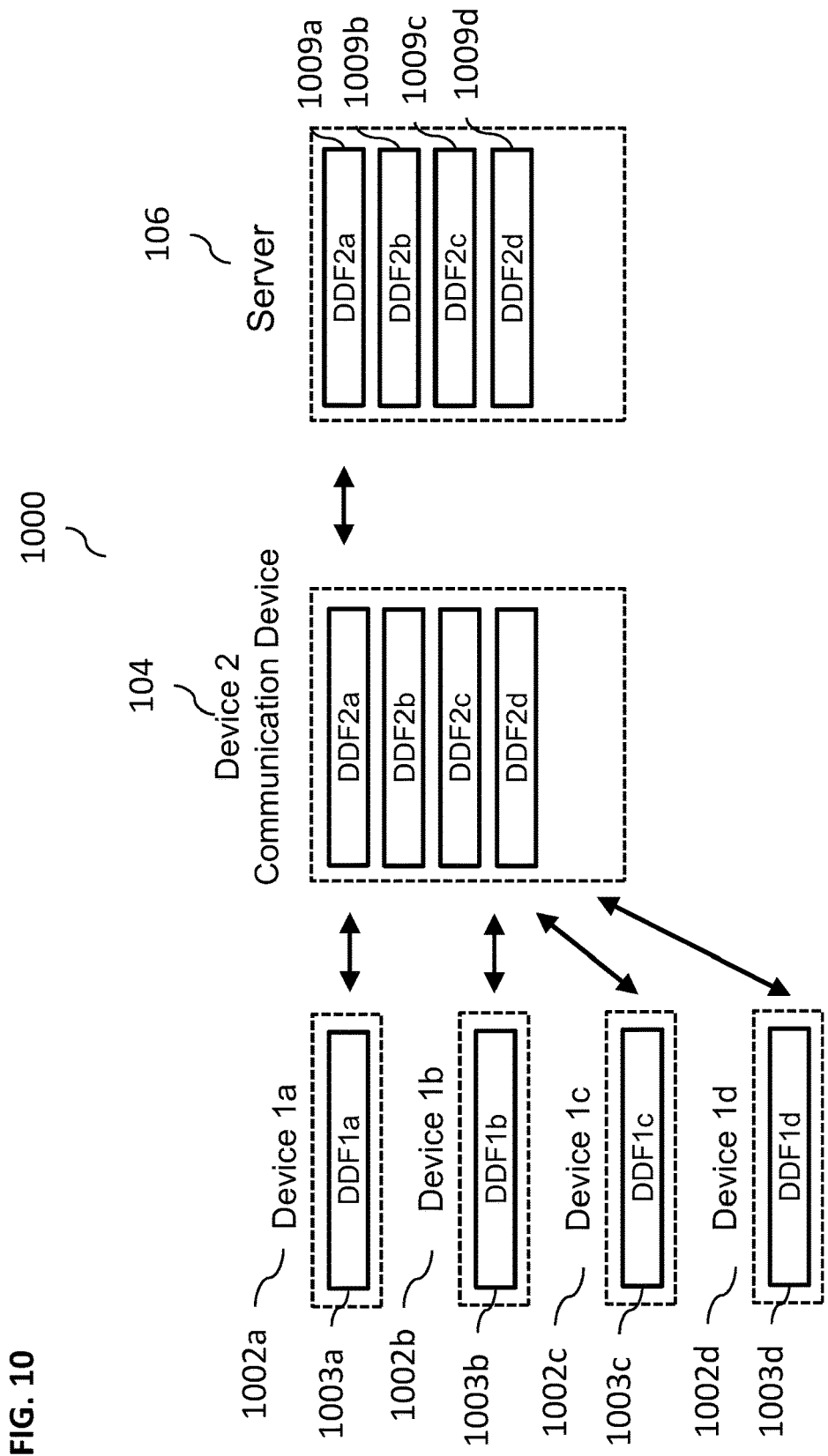
FIG. 10 illustrates an exemplary system for communication between a single communication device and a plurality of pairing devices, according to some implementations of the current subject matter.

FIG. 10 illustrates an exemplary system 1000 for communication between a single communication device and a plurality of pairing devices, according to some implementations of the current subject matter. The system 1000 can include a plurality of devices 1002 (a, b, c, d), a single communication device 104, and a server 106, all of which can be communicatively coupled with one another. The devices 1002 can include and/or be provided with respective data definition files 1 1003 (a, b, c, d). Separate DDF1 IDs can be used to identify each of the DDF1s 1003. Alternatively, one DDF1 ID can be used to identify each of the DDF1s 1003. One or more DDF1s 1003 can be pre-loaded by the manufacturers of the devices and/or can be transmitted to devices 1002 from the server 106 and/or device 104. DDF IDs can be used to request and/or verify that correct DDF1s 1003 are transmitted and/or received by any of the devices/servers. In order to provide communication between the devices 1002 and device 104, the communication device 104 can store DDF2 (a, b, c, d) 1009 (a, b, c, d) corresponding to respective devices 1002 (a, b, c, d). The DDF2s 1009 can be pre-loaded on the device 104 and/or can be provided by the server 106 upon request from device 104.

In some implementations, data interpretation module in device 104 (not shown in FIG. 10) can select an appropriate DDF2 1009 upon detection of an advertising packet and/or a data packet that is received by device 104 from a particular device 1002. Alternatively, a DDF2 ID can be used to select an appropriate DDF2 1009. The selected DDF2 1009 can be used to unpack/extract data from payload of that packet (e.g., DDF2a 1009a can be used to unpack/extract data from payload of one or more data packets received from device 1002a; etc.). In some implementations, one DDF2 1009 can be used to unpack/extract data from payloads of data packets received from one or more or any device 1002. In some implementations, devices 1002 (a, b, c, d) can have different USSKs. Device 2 can transmit a USSK that can be stored in one of devices 1 and can specify which device 1 device 2 should communicate with. Device 2 can use one of the DDF2s associated with the USSK.

Figure 11:
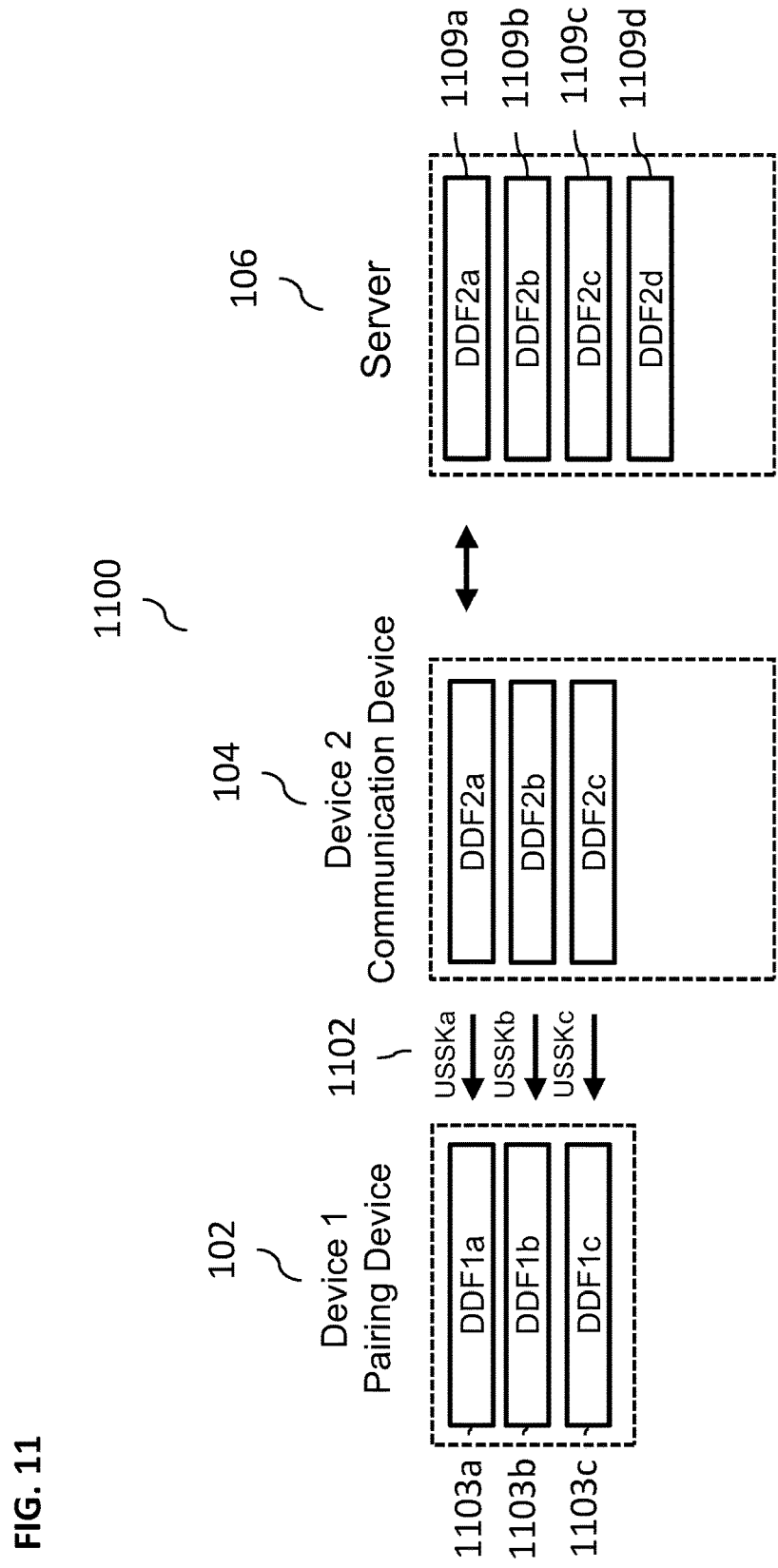
FIG. 11 illustrates an exemplary system for communication between a communication device and a pairing device based on a particular user-specific shared key (USSK), according to some implementations of the current subject matter.

FIG. 11 illustrates an exemplary system 1100 for communication between a communication device and a pairing device based on a particular user-specific shared key (USSK), according to some implementations of the current subject matter. The system 1100 can include device 1 (e.g., a pairing device) 102, device 2 (e.g., a communication device) 104, and a server 106. Device 102 can include a plurality of DDF1 1103 (a, b, c) for communication with device 104. This can be useful when device 102 is used for different purposes and/or can perform different functions and/or different communications. In system 1100, device 104 can use a particular DDF2 1109 (which can be obtained from the server 106 and/or can be pre-loaded on device 104), based on a particular user-specific shared key that the device 102 uses to respond to device 104. For example, if device 102 responds to USSKa 1102, the DDF1a 1103a and DDF2a 1109 can be used for communications between the two devices. In some exemplary implementations, device 2 can use one or more DDF2s for unpacking/extracting data from payloads of data packets received from device 102 irrespective of the type of data packets that have been received from device 102.

Further, the server 106 can store one or more DDF2 1109 and can provide them to device 104 upon request. As shown in FIG. 11, DDF2d has not been provided to device 104 as it is not used by device 104 for communication with device 102.

Alternatively, DDF IDs can be used to request, transmit and/or verify that appropriate DDFs have been received and/or transmitted to the respective devices. Further, instead of and/or in addition to USSK, DDF IDs can be transmitted and/or detected by appropriate device to transmit, receive, and/or verify DDFs.

Figure 12:
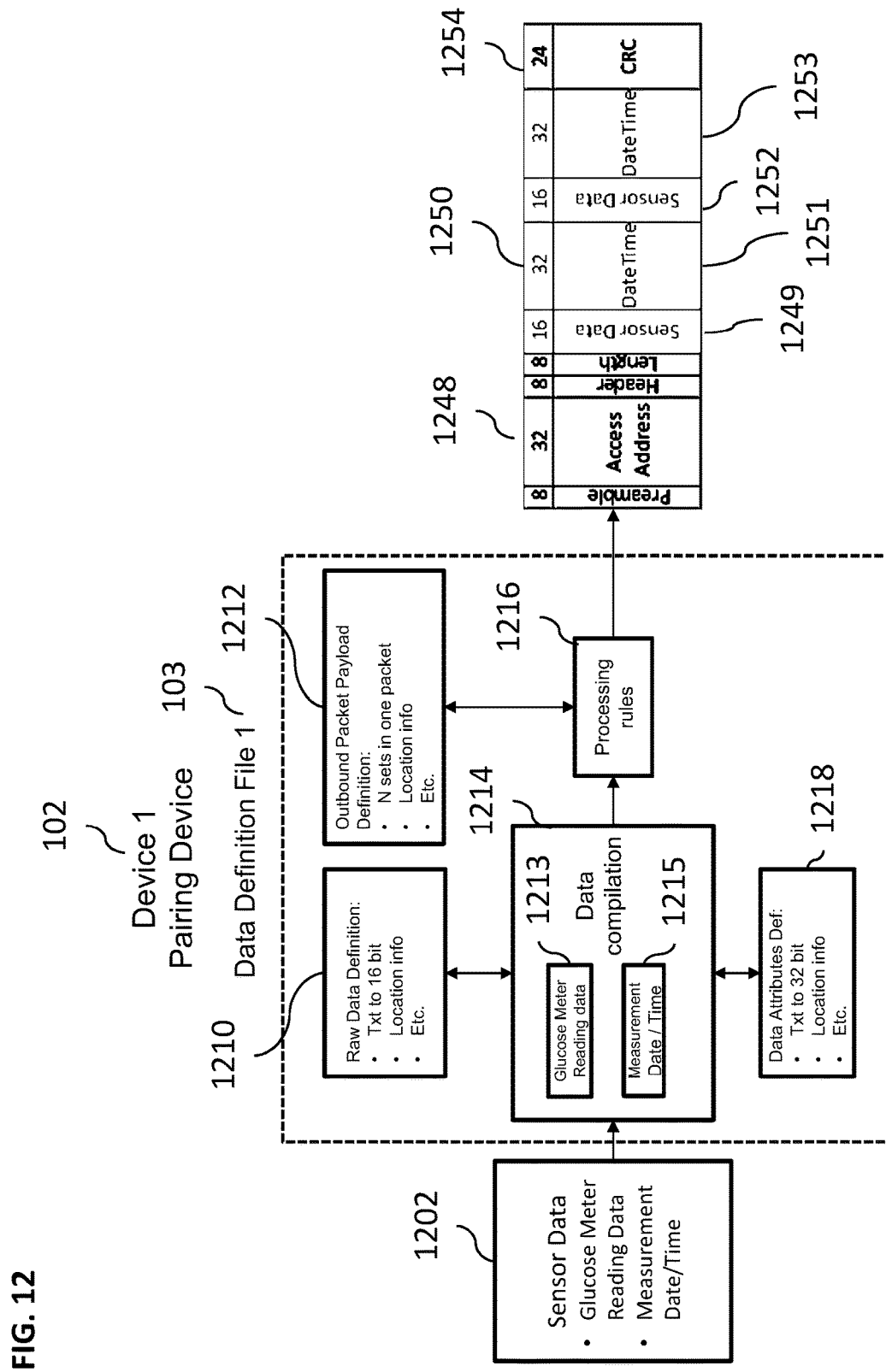
FIG. 12 illustrates an exemplary data mapping in a payload of a data packet, according to some implementations of the current subject matter.

FIG. 12 illustrates an exemplary data mapping in a payload of a data packet, according to some implementations of the current subject matter. For ease of illustration, FIG. 12 discusses data mapping of data relating to measurements of a glucose sensor. As can be understood, this current subject can be applicable to any kind of device 102 data and is not limited to glucose sensors. The data mapping process shown in FIG. 12 is similar to the one discussed with regard to FIGS. 4a-b above. A sensor data 1202, which can include glucose meter reading data, measurements date/time data, etc. can be provided to the device 102. Data compilation module 1214 can use this data along with raw data definitions 1210, data attributes definition 1218 to compile data for generating an outbound packet payload using outbound packet payload definitions 1212. The raw data definitions 1210 can specify how raw data will be interpreted before the data mapped in the payload of a data packet 1250. The outbound packet payload definitions can specify how the data will be mapped in the payload of the data packet 1250. For example, glucose meter reading data 1213 (as compiled) will be mapped starting with bit 57 and 105 locations 1249, 1252 in the payload of the data packet 1250, where each location can have 16 bits. The data attributes definitions 1218 can specify how raw data will be interpreted before the measurements date/time data 1215 (as compiled) will be mapped in the payload of a data packet 1250. The outbound packet payload definition can specify how the data will be mapped in the payload of a data packet 1250. For example, date/time will be mapped starting with bit 73 and 121 locations 1251, 1253 in the payload of the data packet 1250, where each location can have 32 bits. The outbound packet payload definitions can specify how many sets of data (e.g., "N" where N can be an integer greater or equal to zero) will be in the payload. As shown in FIG. 12, there are two sets of data in the payload.

In some exemplary implementations, processing rules 1216 can be used by the processor of device 102 to generate the outbound packet 1250 for transmission to the device 104 (not shown in FIG. 12) using the definitions 1210, 1212, 1218 and data 1202 that has been supplied. The packet 1250 can include various standard components 1248 (e.g., a preamble having 8 bits, an access address having 32 bits, a header having 8 bits, an identification of length of the packet having 8 bits) and cyclic redundancy check ("CRC") 1254, which is located at the end of the packet. These standard components can be used to ensure proper transmission from the source (i.e., device 102) and receipt of the data packet at destination (i.e., device 104) over a communication link (e.g., a BLE communication link, a wireless communication link, a wired communication link, and/or any other link and/or any combination thereof). In some implementations, because definitions 1210, 1212, and 1218 are used, the payload (as contained in 1249, 1251, 1252, and 1253) of the data packet 1250 can be having a specific fixed size, e.g., as shown in FIG. 12, the size of the payload is 96 bits. In alternate implementations, the size of the payload can be variable.

Figure 13:
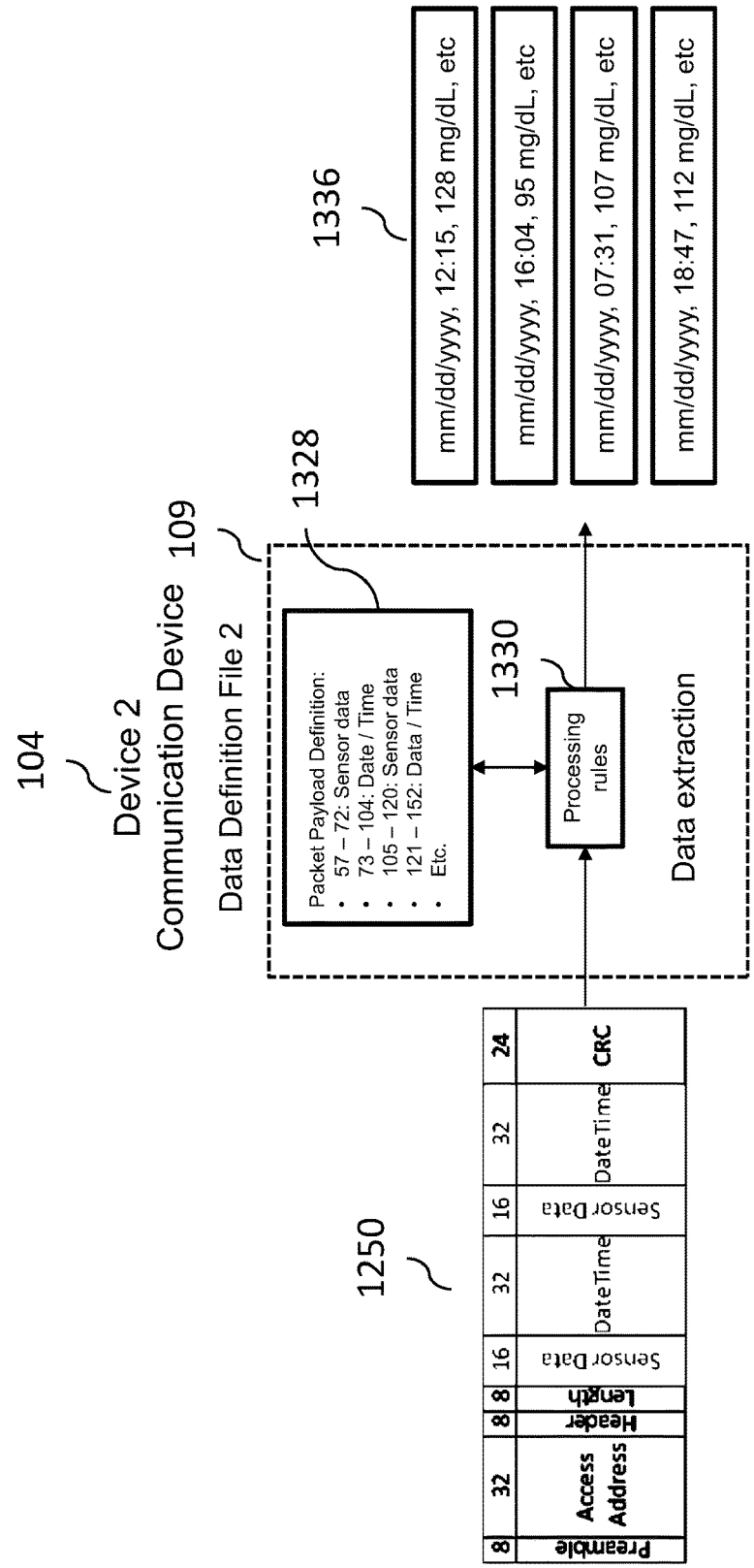
FIG. 13 illustrates an exemplary unpacking/extraction of data from the payload of the data packet by the processor of a communications device, according to some implementations of the current subject matter.

FIG. 13 illustrates an exemplary unpacking/extraction of data from the payload of the data packet 1250 by the processor of device 104, according to some implementations of the current subject matter. Once the packet 1250 (shown in FIG. 12) arrives at device 104, a processor of device 104 can use DDF2 109 be used to unpack/extract the data from its payload. The DDF2 109 can include packet payload definitions 1328. The definitions 1328 can specify that sensor data is contained in the payload in locations corresponding to bits 57-72 and 105-120 and date/time data is contained in the payload in locations corresponding to bits 73-104 and 121-152. Processing rules 1330 along with the definitions 1328 can be used to extract data from the payload of the data packet 1250 and present data 1336 on the device 104. The data can be presented in any format that may be desired by the user of the device 104 and/or a particular format may be specified (e.g., as shown in FIG. 13). The data 1336 can be transmitted to the server (not shown in FIG. 13) for storage and/or to management of data.

Figure 14:
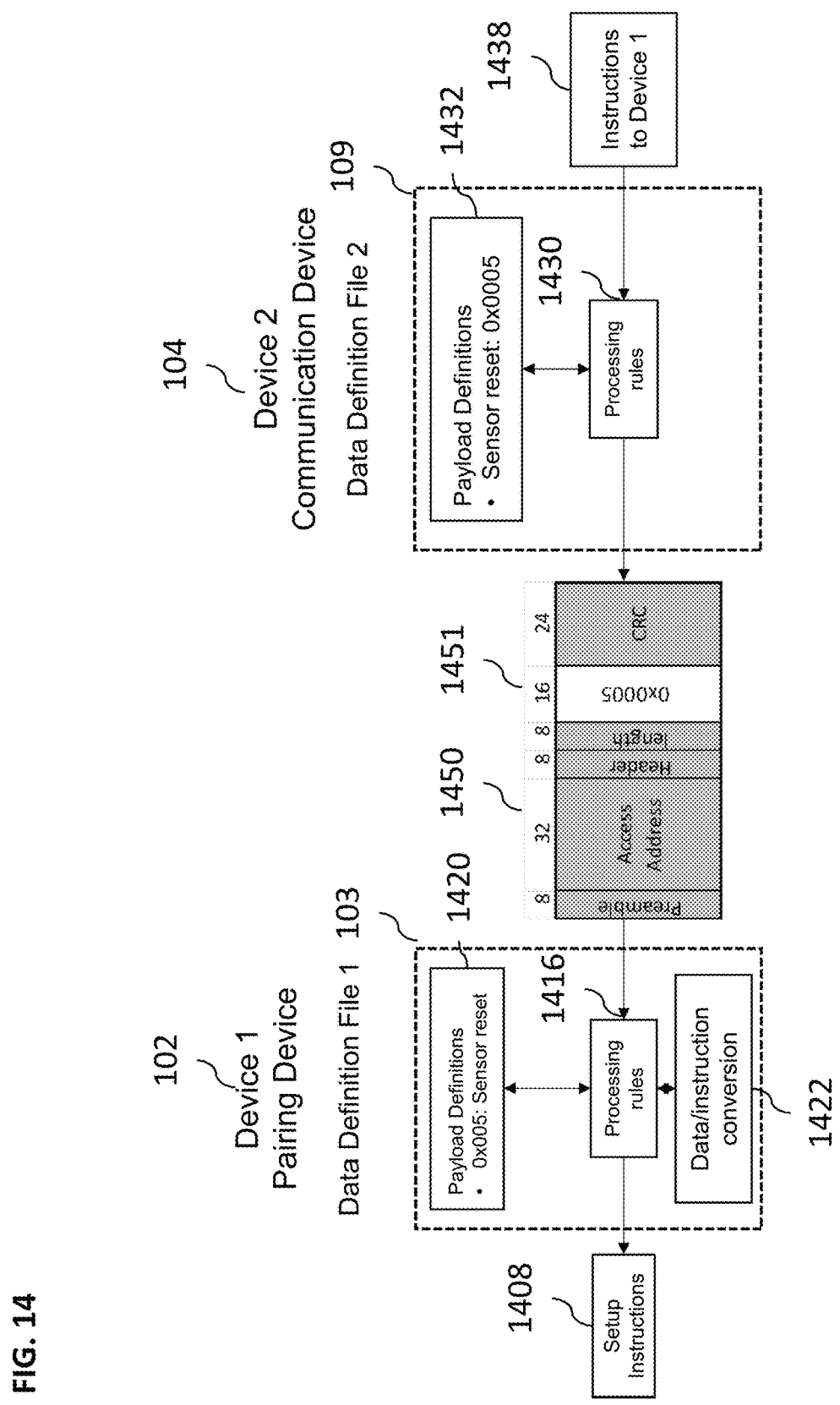
FIG. 14 illustrates an exemplary transmission of data from a communications device to a pairing device, according to some implementations of the current subject matter.

FIG. 14 illustrates an exemplary transmission of data from device 104 to device 102, according to some implementations of the current subject matter. In the example of a glucose sensor, the transmitted data can include instructions to the sensor to start measurements, set clock, etc. As can be understood, the data transmitted to device 102 is not limited to instructions and can be any other data. Referring back to FIG. 14, device 104 can generate and/or obtain instructions 1438 (e.g., instructions to reset sensor). The instructions 1438 can be internally generated, entered by the user, supplied by an external entity, etc. The instructions 1438 can be transmitted by the server 106 (not shown in FIG. 14). Device 104's data definition file 2 109 can be used to prepare a data packet 1450 based on the instructions 1438 for transmission to device 102.

The instructions 1438 can be supplied to the processing rules 1430, which along with device 1 payload definitions 1432 (e.g., "Sensor reset: 0x0005") can map the data into an inbound packet 1450. A payload 1451 of the data 1450 can comprise of 16 bits (starting at bit 57) can incorporate the above instruction (i.e., "0x0005"). Other standard components (as shown in FIG. 14) can be included in the data packet 1450 to ensure transmission of the data packet 1450 to the correct destination, i.e., device 102.

Once the packet 1450 is received by the device 102, data definition file 1 103 can be used to unpack/extract the data contained in the payload of the data packet 1450, i.e., instructions to reset the sensor. Processing rules 1416 along with an inbound packet payload definitions 1420 can be used by the processor of device 102 to unpack/extract data in the payload of the received data packet. Using the payload definitions 1420, device 102's processor, using the processing rules (e.g., data/instruction conversion) 1422, can determine that the received data/instruction corresponds to an instruction to reset sensor (e.g., "0x0005: Sensor reset"). The extracted instructions 1408 can be provided to the sensor for an appropriate action.

While FIGS. 12-14 illustrate scenarios where one or more sets of data can be placed in a payload of single data packet, in some exemplary implementations, data can be split into two or more data packets. For example, this can be done to ensure that predetermined size of the payload of a data packet is not exceeded. Alternatively, this can ensure more expedient communications, as larger payload data packets can require more time for transmission/receipt. The total size and/or specific sizes of particular data to be included in the payload of the data packet (whether being transmitted from device 102 to device 104 or vice versa) can be predetermined based on a variety of factors, e.g., data being transmitted, devices 102, 104, user preferences, developer preferences, communication links' requirements, etc. The total sizes of payloads as well as sizes of specific sections of data shown in FIGS. 12-14 are provided here for illustrative purposes only and the current subject matter is not limited to the sizes shown.

Further, while processing rules are shown in FIGS. 12-14, such processing rules can be optional and the payloads can be packed with data based on definitions alone. Further, as can be understood data in the payload of one or more data packets transmitted by device 102 can be modified, combined, separated, deleted, etc. either prior to the time of transmission from device 102, during transmission to device 104, and/or at the time of receipt by device 104. In some implementations, the payloads can include instructions for combination of data from one or more data packets.

In some implementations, DDFs can be encrypted when they are created, transmitted and/or stored. This can be done for security reasons and/or to maintain confidentiality of DDFs' content. Integrity of DDF content can be protected using various security measures, e.g., certificate(s), checksum(s), etc.

In some implementations, processing rules can include communication protocols, e.g., the protocols can specify the type of data packet and/or the type of content in the data packet that can be exchanged in particular order. This can enhance security in communications between devices 1 and 2 and/or any other devices, as DDFs and/or DDF IDs are exchanged on demand. Other types of security measures can be implemented to protect communications between devices 1 and 2, the server(s), and/or any other devices.

Figure 15:
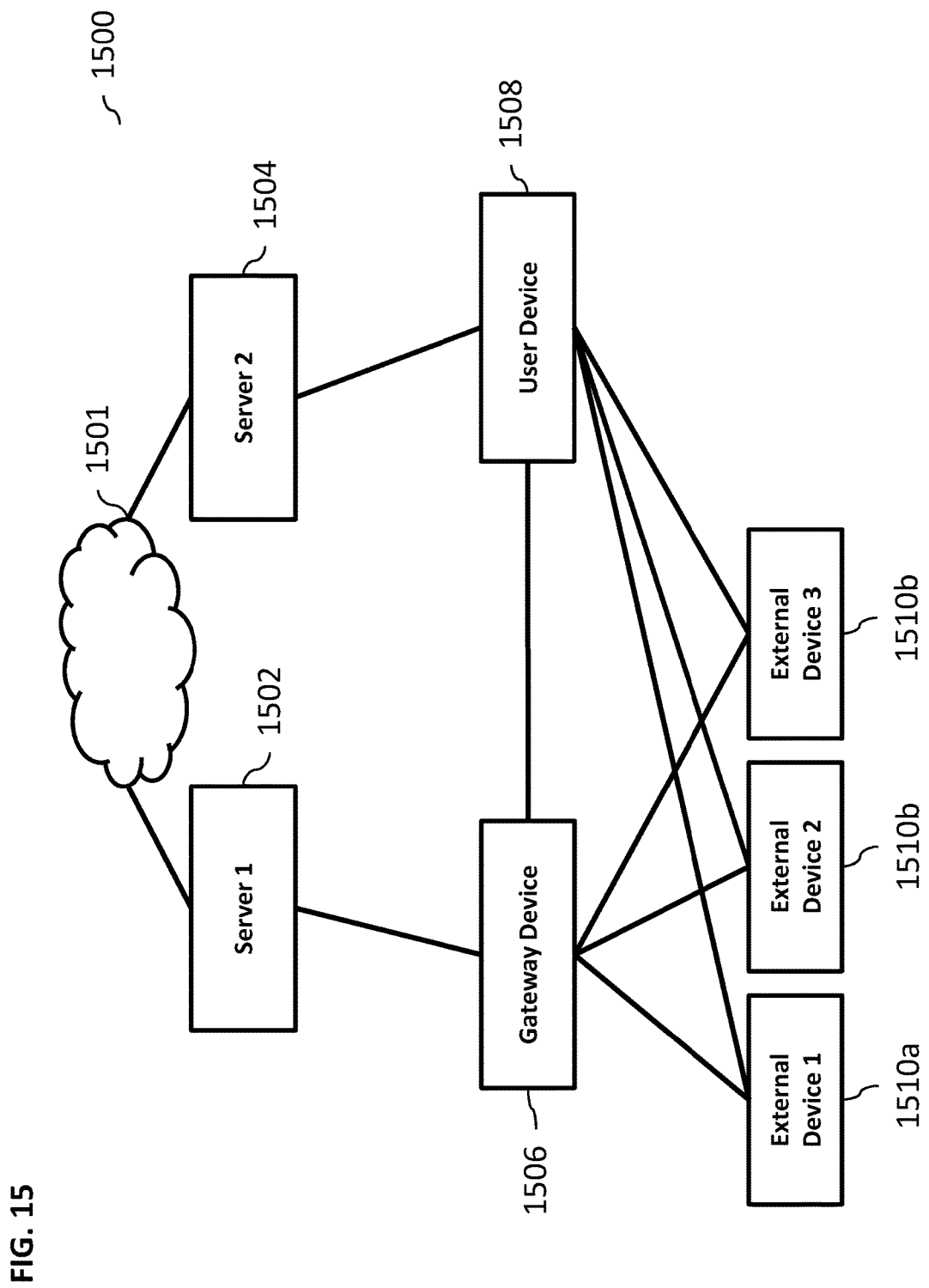
FIG. 15 illustrates an exemplary system that can use a gateway (or any other similar device) for providing communications between devices, according to some implementations of the current subject matter.

FIG. 15 illustrates an exemplary system 1500 that can use a gateway (or any other similar device) for providing communications between devices, according to some implementations of the current subject matter. The system 1500 can include a server 1 1502 and a server 2 1504 communicatively coupled over a network (e.g., a cloud) 1501 (alternatively, only server or more than two servers can be used), a gateway device 1506, a user device 1508, and one or more external devices 1510 (a, b, c). In some implementations, one or more or all components of the system 1500 can be communicatively coupled with each via any type of wired and/or wireless connections. In exemplary implementations, the gateway device 1506 can be communicatively coupled with the server 1 1502 using an Ethernet connection and/or a wireless connection and/or any other type of connection; user device 1508 can be communicatively coupled with the server 2 1504 using a wireless connection (e.g., LTE, WiFi, etc.); the gateway device 1506 and the user device 1508 can be communicatively coupled using a wireless connection, such as a Bluetooth connection; the external devices 1510 can be communicatively coupled to one or both of the gateway device 1506 and/or the user device 1508 using a wireless connection, such as Bluetooth connection. In further exemplary, non-limiting implementations, the external devices 1510 can be one or more of the following a sensor, a door lock, an identification tag, a television, a radio, a computing device, a telephone, a wireless telephone, a smartphone, a tablet computer, a personal computer, a laptop computer, a server, a gateway, a networking element, a network of devices, a relay device, an intermediate device, an endpoint device, a wireless speaker, a wired speaker, a wireless receiver, a wired receiver, a transceiver, a base station, a router, a modem, and/or any other device and/or any combination thereof.

In some implementations, the gateway device 1506 can be used for the purposes of providing communication between the user device 1508 and the external devices 1510. The gateway device 1506 can be used to provide security to the communications, whereby data, received and/or transmitted to and/or from, the external devices 1510 and/or the user device 1508 can be requested and/or verified using appropriate DDFs and/or DDF IDs in accordance with one or more implementations discussed above. The gateway device 1506 can be positioned anywhere in relation to the external devices 1510. In some implementations, the gateway device 1506 can be used to maintain an on-demand and/or a continuous communication with one or more external devices 1510. The server 1502 (and/or server 1504) can control how the gateway device 1506 interacts with the external devices 1510, including, but not limited to, collecting data from the external devices 1510, providing instructions to the external devices 1510 to perform various tasks, etc. The gateway device 1506 can also independently execute tasks with the server 1502 (and/or server 1504) and/or one or more external devices 1510. The gateway device 1506 can be configured to include a human interface so that it may accept commands and/or display its states, etc. For example, the gateway device 1506 can have a communication interface with user device 1508. Further, in some non-limiting, exemplary implementations, one or more external devices 1510 can be akin to pairing devices discussed above and the gateway device 1506 and user device 1508 can be akin to communication devices discussed above, where servers 1502/1504 can be similar to servers, as also discussed above. In further non-limiting, exemplary implementations, the gateway device 1506 can be akin to a communication device and the user device 1508 can be akin to a pairing device, discussed above, or vice versa. The gateway device 1506, the external devices 1510 and/or the user device 1508 can request (and/or can be requested of) to receive and/or transmit DDFs and/or DDF IDs in accordance with one or more implementations discussed above. Further, the gateway device 1506 can be positioned anywhere in relation to the external devices 1510.

In some implementations, the server 2 1504 can generate, store and/or provide one or more shared keys (as discussed above) to the gateway device 1506 and/or the user device 1508. The shared keys can be used to establish communication between the gateway device 1506, the user device 1508 and/or one or more of the external devices 1510. Use of the shared keys is discussed in the co-owned, co-pending U.S. patent application Ser. No. 14/992,642 to Yamada, filed Jan. 11, 2016 and entitled "Selective Pairing of Wireless Devices Using Shared Keys", which claims priority to U.S. Provisional Appl. No. 62/194,939, filed Jul. 21, 2015, the disclosures of which are incorporated herein by reference in their entireties. The combination of the gateway device 1506, the user device 1508, and/or one or more external devices 1510 can be used for the purposes of access control, machine-to-machine data collection, device control, targeted notifications/advertisements, coupon disbursement, payment, payment permissions/confirmations, digital signing/signage, etc. In some implementations, data, data definitions, data definition file identifiers, shared keys, and/or any other data can be transmitted simultaneously and/or on-demand and/or one in a predetermined sequence, and/or can be encrypted. In some implementations, external device(s) 1510 can generate private encryption key(s) and/or public encryption key(s). The public encryption key(s) can be shared with the gateway device 1506 and/or the user device 1508. When the gateway device 1506 and/or the user device 1508 communicate with external device 1510, its transmission can be encrypted by the public encryption key(s) that the external device 1510 generated and shared. When external device 1510 encrypts its transmission to the gateway device 1506 and/or the user device 1508, their respective public encryption key(s) can be used, provided that the gateway device 1506 and/or the user device 1508 have their own public encryption keys shared with external device 1510.

In access control exemplary implementations, the user device 1508 can request the server 1504 to provide it with an access to a particular external device 1510 (e.g., a door in a hotel room). The server 1504 can verify the user device 1508 is authorized (e.g., a user of the user device 1508 supplied appropriate credentials to verify identity of the user/user device and/or authenticating the user device and/or software on the user device) and/or proximate to the external device 1510. Once authentication is complete, the gateway device 1506 can be used to coordinate access between the user device 1508 and the external device 1510 (for example, by supplying specific shared key to both the user device 1508 and the external device 1510 that allows the user device 1508 to access the external device 1510). In alternate implementations, for access control, the gateway device 1506 might not be needed because access control can be achieved by the user device 1508 and/or the external device(s) 1510 having the right shared key and DDFs associated with an appropriate DDF ID. Server 1504 (and/or 1502 and/or a combined server 1502/1504) can supply specific shared key on-demand to both the user device 1508 and/or the external device(s) 1510 that can allow the user device 1508 to access the external device(s) 1510. Server 1504 (and/or 1502 and/or a combined server 1502/1504) can also provide DDF(s) if so required/requested. Further, one or more servers 1502/1504 might also not be needed as long as a communication exists between the other server and the external device(s) 1510.

In some implementations, the gateway device 1506 can be configured to communication with a large plurality of external devices 1510 (e.g., tens, hundreds, thousands, millions, etc.) and can control operation, pairing of devices with other components of the system 1500 (if necessary), collect various information from the devices 1510, and/or provide this information to the servers 1502 and/1504. Similarly, the system 1500 can be used for the purposes of location tracking (e.g., tracking of employee and/or item locations in a large warehouse, tracking of rescuers' locations in a recovery/relief efforts after occurrence of a disaster) and/or tracking external devices 1510.

In some implementations, to initiate and/or setup a particular external device 1510 (e.g., a sensor), the user device 1508 can communicate with the external device 1510 and perform an initial setup (e.g., perform sensor function diagnosis, account setup, location registration, exchange data definition files, data definition file identifiers, shared keys, etc.). The user device 1508 can communicate with the gateway device 1506 and perform an initial setup (e.g., perform sensor function diagnosis, account setup, location registration, exchange data definition files, data definition file identifiers, shared keys, etc.). One or more of the servers 1502 and/or 1504 can be used to supply appropriate connection information (e.g., DDF, DDF ID, shared key, etc.). The user device 1508 can access one or more the external devices 1510 and can perform an initial setup. The gateway device 1506 can then establish connection with the one or more external devices 1510, including providing appropriate connection information (e.g., DDF, DDF ID, shared key, etc.) and completing pairing and/or provisioning if required. The user device 1508 can then receive a confirmation that connection between the gateway device 1506 and the external device has been established. Once the connections between the gateway device 1506 and the external devices 1510 have been established, one or more servers 1502 and/or 1504 can transmit instruction to initiate operation of the gateway device 1506 and the one or more devices 1510 (e.g., turn on a temperature sensor and begin measuring temperature). In some implementations, a new user device 1508 can request and receive DDF, DDF ID, shared key, etc. from one of the servers 1502 and/or 1504 in order to establish communication with external devices and/or to perform device function diagnosis and/or maintenance (e.g., this can be performed, after the new user device 1508 and/or its user is authenticated). In some implementations, the system 1500 is not limited to the configuration shown in FIG. 15. For example, there can be multiple gateway devices 1506, multiple user devices 1508, multiple servers (and/or one combined server), etc. Any type of communication/connection mechanisms between the components of the system 1500 can be used.

Figure 16:
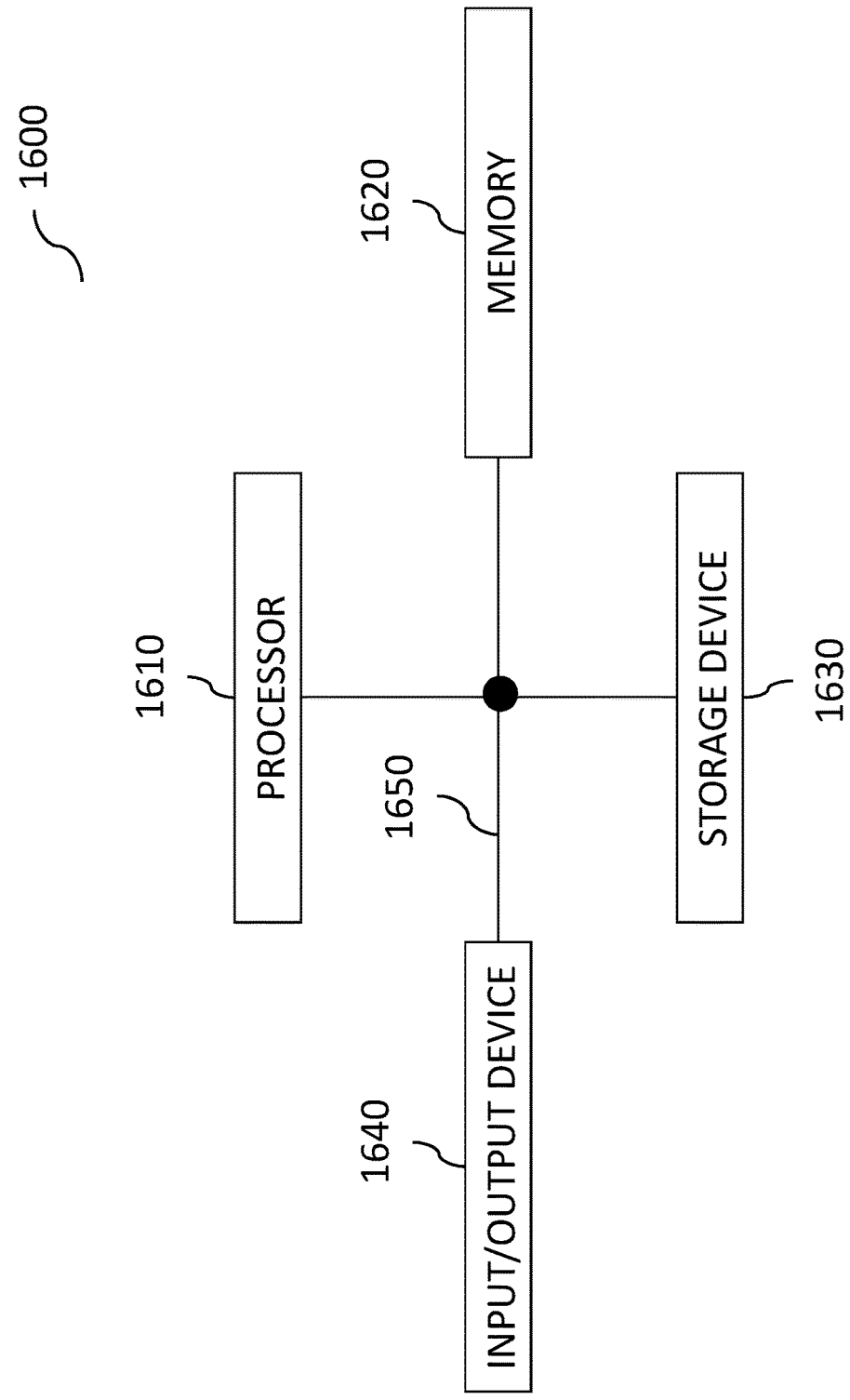
FIG. 16 illustrates an exemplary system, according to some implementations of the current subject matter.

In some implementations, the current subject matter can be configured to be implemented in a system 1600, as shown in FIG. 16. The system 1600 can include a processor 1610, a memory 1620, a storage device 1630, and an input/output device 1640. Each of the components 1610, 1620, 1630 and 1640 can be interconnected using a system bus 1650. The processor 1610 can be configured to process instructions for execution within the system 1600. In some implementations, the processor 1610 can be a single-threaded processor. In alternate implementations, the processor 1610 can be a multi-threaded processor. The processor 1610 can be further configured to process instructions stored in the memory 1620 or on the storage device 1630, including receiving or sending information through the input/output device 1640. The memory 1620 can store information within the system 1600. In some implementations, the memory 1620 can be a computer-readable medium. In alternate implementations, the memory 1620 can be a volatile memory unit. In yet some implementations, the memory 1620 can be a non-volatile memory unit. The storage device 1630 can be capable of providing mass storage for the system 1600. In some implementations, the storage device 1630 can be a computer-readable medium. In alternate implementations, the storage device 1630 can be a floppy disk device, a hard disk device, an optical disk device, a tape device, non-volatile solid state memory, or any other type of storage device. The input/output device 1640 can be configured to provide input/output operations for the system 1600. In some implementations, the input/output device 1640 can include a keyboard and/or pointing device. In alternate implementations, the input/output device 1640 can include a display unit for displaying graphical user interfaces.

Figure 17:
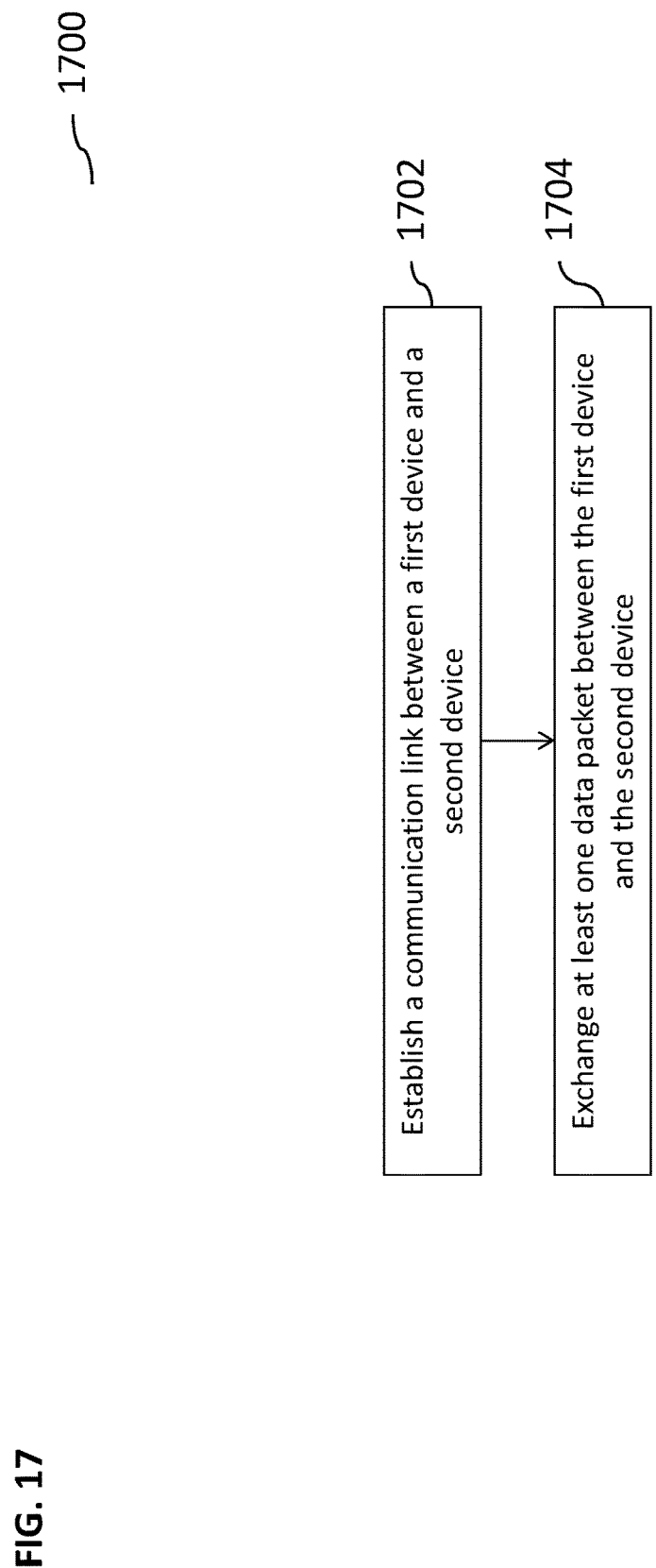
FIG. 17 illustrates an exemplary method, according to some implementations of the current subject matter.

FIG. 17 illustrates an exemplary method 1700 for providing a communication between a plurality of devices, according to some implementations of the current subject matter. At 1702, a communication link can be established between a first device (e.g., a pairing device 102) and a second device (e.g., a communication device 104). At 1704, at least one data packet can be exchanged between the first device and the second device. The first device can use a first data definition (e.g., DDF1 103) to extract data from a payload of the data packet when the data packet is received from the second device. The second device can use a second data definition (e.g., DDF2 109) to extract data from the payload of the data packet when the data packet is received from the first device.

In some implementations, the current subject matter can include one or more of the following optional features. A payload of one or more data packets transmitted to the first device can be generated in accordance with at least one first data definition. A payload of one or more data packets transmitted to the second device can be generated in accordance with at least one second data definition. At least one first data definition can be associated with a first data definition identifier. The first device can be configured to request at least one first data definition using the first data definition identifier. At least one second data definition can be associated with a second data definition identifier. The second device can be configured to request at least one second data definition using the second data definition identifier.

The first device can be a pairing device and the second device can be a communications device. In some implementations, the devices can be computing devices, telephones, wireless telephones, smartphones, tablet computers, personal computers, laptop computers, servers, gateways, networking element(s), network(s) of devices, relay and/or intermediate devices (e.g., devices through which data packets are configured to pass through), endpoint devices, wireless and/or wired speakers, wireless and/or wired receivers and/or transceivers, base stations (e.g., macro, micro, femto, pico, etc. base stations), routers, modems, and/or any other type of devices, and/or any combinations thereof.

In some implementations, the first data definition can specify a first data (including type, location, etc.) in the payload(s) of the data packet(s) received by the first device based on the inclusion of the first data (including its type, location, etc.) in the payload(s) of the data packet(s) by the second device. The second data definition can specify a second data (including type, location, etc.) in the payload(s) of the data packet(s) received by the second device based on the inclusion of the second data (including its type, location, etc.) in the payload(s) of the data packet(s) by the first device.

In some implementations, a server can be communicatively coupled to at least one of the first device and the second device. The server can generate at least one of the first data definition and the second data definition. The server can provide at least one of the first data definition and the second data definition to at least one of the first device and the second device.

In some implementations, exchanging of data between the first device and the second device can be dependent on the first device using the first data definition and the second device using the second data definition. Alternatively, exchanging of data between the first device and the second device can be dependent on the first data definition being dependent on the second data definition and/or vice versa.

In some implementations, a plurality of first devices can be communicatively coupled to a plurality of second devices, where each first device in the plurality of first devices can use its own first data definition in a plurality of first data definitions and each second device in the plurality of second devices can use its own second data definition in a plurality of second data definitions.

In some implementations, the method can further include receiving, by the first device, a first data definition identifier corresponding to at least one first data definition, and receiving, by the second device, a second data definition identifier corresponding to at least one second data definition. Further, the method can also include verifying, using the first device, at least one first data definition using the corresponding received first data definition identifier. Upon verification of at least one first data definition, the method can perform extraction of data from one or more payloads of at least one or more data packets when at least one or more data packets is received from the second device. Upon failing to verify at least one first data definition, the method can prevent extraction of data from one or more payloads of at least one or more data packets when at least one or more data packets is received from the second device. Additionally, the method can also include verifying, using the second device, at least one second data definition using the corresponding received second data definition identifier. Upon verification of at least one second data definition, the method can perform extraction of data from one or more payloads of at least one or more data packets when at least one or more data packets is received from the first device. Upon failing to verify at least one second data definition, the method can prevent extraction of data from one or more payloads of at least one or more data packets when at least one or more data packets is received from the first device.

In some implementations, the method can also include verifying at least one first data definition using the corresponding received first data definition identifier. Upon verification of at least one first data definition, the method can generate one or more payloads of at least one or more data packets using at least one first data definition. Upon failing to verify at least one first data definition, the method can prevent generation of one or more payloads using at least one first data definition. The method can also include verifying at least one second data definition using the corresponding received second data definition identifier. Upon verification of at least one second data definition, the method can generate one or more payloads of at least one or more data packets using at least one second data definition. Upon failing to verify at least one second data definition, the method can prevent generation of one or more payloads using at least one second data definition.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   establishing a communication link between a first device and a second device; and
   exchanging at least one or more data packets between the first device and the second device, including
      receiving, by the first device, the at least one or more data packets from the second device, and extracting, by the first device, using at least one first data definition to extract data from one or more payloads of the at least one or more data packets, and
      receiving, by the second device, the at least one or more data packets from the first device, and extracting, by the second device, using at least one second data definition, data from the one or more payloads of the at least one or more data packets,
      a payload of the one or more data packets transmitted to the second device from the first device is generated by the first device in accordance with the at least one second data definition stored by the first device.

2. The method according to claim 1, wherein
   a payload of one or more data packets transmitted to the first device is generated in accordance with the at least one first data definition.

3. The method according to claim 1, wherein
   the at least one first data definition is associated with a first data definition identifier, wherein the first device is configured to request the at least one first data definition using the first data definition identifier; and
   the at least one second data definition is associated with a second data definition identifier, wherein the second device is configured to request the at least one second data definition using the second data definition identifier.

4. The method according to claim 1, wherein the first device is a pairing device and the second device is a communications device.

5. The method according to claim 4, wherein the devices include at least one of the following: a computing device, a telephone, a wireless telephone, a smartphone, a tablet computer, a personal computer, a laptop computer, a server, a gateway, a networking element, a network of devices, a relay device, an intermediate device, an endpoint device, a wireless speaker, a wired speaker, a wireless receiver, a wired receiver, a transceiver, a base station, a router, a modem, and any combinations thereof.

6. The method according to claim 1, wherein the at least one first data definition specifies a first data in the one or more payloads of the one or more data packets received by the first device based on an inclusion of the first data in the one or more payloads of the one or more data packets by the second device.

7. The method according to claim 1, wherein the at least one second data definition specifies a second data in the one or more payloads of the one or more data packets received by the second device based on an inclusion of the second data in the one or more payloads of the one or more data packets by the first device.

8. The method according to claim 1, wherein a server is communicatively coupled to the at least one of the first device and the second device.

9. The method according to claim 7, further comprising
   generating, by the server, at least one of the at least one first data definition and the at least one second data definition; and
   providing, by the server, the at least one of the at least one first data definition and the at least one second data definition to at least one of the first device and the second device.

10. The method according to claim 1, wherein the exchanging of data between the first device and the second device is based on the first device using the at least one first data definition and the second device using the at least one second data definition.

11. The method according to claim 1, wherein the exchanging of data between the first device and the second device is based on a dependency between the at least one first data definition and the at least one second data definition.

12. The method according to claim 1, wherein a plurality of first devices is communicatively coupled to a plurality of second devices, wherein each first device in the plurality of first devices uses its own first data definition in a plurality of first data definitions, and each second device in the plurality of second devices uses its own second data definition in a plurality of second data definitions.

13. The method according to claim 1, further comprising
   receiving, by the first device, a first data definition identifier corresponding to the at least one first data definition; and
   receiving, by the second device, a second data definition identifier corresponding to the at least one second data definition.

14. The method according to claim 13, further comprising
   verifying, using the first device, the at least one first data definition using the corresponding received first data definition identifier, wherein
   upon verification of the at least one first data definition, performing extraction of data from the one or more payloads of the at least one or more data packets when the at least one or more data packets is received from the second device; and
   upon failing to verify the at least one first data definition, preventing extraction of data from one or more payloads of the at least one or more data packets when the at least one or more data packets is received from the second device; and
   verifying, using the second device, the at least one second data definition using the corresponding received second data definition identifier, wherein
   upon verification of the at least one second data definition, performing extraction of data from the one or more payloads of the at least one or more data packets when the at least one or more data packets is received from the first device; and
   upon failing to verify the at least one second data definition, preventing extraction of data from one or more payloads of the at least one or more data packets when the at least one or more data packets is received from the first device.

15. The method according to claim 13, further comprising
   verifying the at least one first data definition using the corresponding received first data definition identifier, wherein upon verification of the at least one first data definition, generating the one or more payloads of the at least one or more data packets using the at least one first data definition; and upon failing to verify the at least one first data definition, preventing generation of one or more payloads using the at least one first data definition; and verifying the at least one second data definition using the corresponding received second data definition identifier, wherein upon verification of the at least one second data definition, generating the one or more payloads of the at least one or more data packets using the at least one second data definition; and upon failing to verify the at least one second data definition, preventing generation of one or more payloads using the at least one second data definition.

16. A system comprising:

at least one programmable processor; and a machine-readable medium storing instructions that, when executed by the at least one programmable processor, cause the at least one programmable processor to perform operations comprising:

establishing a communication link between a first device and a second device; and exchanging at least one or more data packets between the first device and the second device, including receiving, by the first device, the at least one or more data packets from the second device, and extracting, by the first device, using at least one first data definition, data from one or more payloads of the at least one or more data packets, and receiving, by the second device, the at least one or more data packets from the first device, and extracting, by the second device, using at least one second data definition, data from the one or more payloads of the at least one or more data packets, a payload of the one or more data packets transmitted to the second device from the first device is generated by the first device in accordance with the at least one second data definition stored by the first device.

17. The system according to claim 16, wherein a payload of one or more data packets transmitted to the first device is generated in accordance with the at least one first data definition.

18. The system according to claim 16, wherein the at least one first data definition is associated with a first data definition identifier, wherein the first device is configured to request the at least one first data definition using the first data definition identifier; and the at least one second data definition is associated with a second data definition identifier, wherein the second device is configured to request the at least one second data definition using the second data definition identifier.

19. A computer program product comprising a non-transitory machine-readable medium storing instructions that, when executed by at least one programmable processor, cause the at least one programmable processor to perform operations comprising:

establishing a communication link between a first device and a second device; and exchanging at least one or more data packets between the first device and the second device, including receiving, by the first device, the at least one or more data packets from the second device, and extracting, by the first device, using at least one first data definition, data from one or more payloads of the at least one or more data packets, and receiving, by the second device, the at least one or more data packets from the first device, and extracting, by the second device, using at least one second data definition, data from the one or more payloads of the at least one or more data packets, a payload of the one or more data packets transmitted to the second device from the first device is generated by the first device in accordance with the at least one second data definition stored by the first device.

20. The computer program product according to claim 19, wherein a payload of one or more data packets transmitted to the first device is generated in accordance with the at least one first data definition.

21. The computer program product according to claim 19, wherein the at least one first data definition is associated with a first data definition identifier, wherein the first device is configured to request the at least one first data definition using the first data definition identifier; and the at least one second data definition is associated with a second data definition identifier, wherein the second device is configured to request the at least one second data definition using the second data definition identifier.

* * * * *